US010572571B2

(12) United States Patent
Block et al.

(10) Patent No.: US 10,572,571 B2
(45) Date of Patent: Feb. 25, 2020

(54) API FOR SPECIFYING DISPLAY OF COMPLICATION ON AN ELECTRONIC WATCH

(71) Applicant: Apple Inc., Cupertino, CA (US)

(72) Inventors: Eliza C. Block, San Francisco, CA (US); David A. Schimon, San Francisco, CA (US); Eric Lance Wilson, San Jose, CA (US); Paul W. Salzman, Palo Alto, CA (US); Aurelio Guzman, San Jose, CA (US); Christopher Wilson, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 624 days.

(21) Appl. No.: 14/872,117

(22) Filed: Sep. 30, 2015

(65) Prior Publication Data

US 2016/0357282 A1 Dec. 8, 2016

Related U.S. Application Data

(60) Provisional application No. 62/171,955, filed on Jun. 5, 2015.

(51) Int. Cl.
*G06F 17/00* (2019.01)
*G06F 17/21* (2006.01)
(Continued)

(52) U.S. Cl.
CPC ............ *G06F 17/211* (2013.01); *G06F 1/163* (2013.01); *G06F 3/0488* (2013.01); *G06F 3/14* (2013.01);
(Continued)

(58) Field of Classification Search
CPC .......... G06F 17/21; G06F 17/24; G06F 1/163; G06F 3/0481; G06F 3/0482;
(Continued)

(56) References Cited

U.S. PATENT DOCUMENTS 5,379,153 A 1/1995 Ishii et al.
5,440,559 A 8/1995 Gaskill
(Continued)

FOREIGN PATENT DOCUMENTS

EP 1898178 A2 3/2008
EP 2360902 A2 8/2011
(Continued)

OTHER PUBLICATIONS

International Search Report and Written Opinion dated Sep. 9, 2016, in PCT/US2016/034961, 12 pages.
(Continued)

*Primary Examiner* — William L Bashore
*Assistant Examiner* — David Faber
(74) *Attorney, Agent, or Firm* — Kilpatrick Townsend & Stockton LLP

(57) ABSTRACT

Systems, methods, and devices can efficiently manage the displaying of text on a screen of a computing device. For example, a client application can provide a data object for a particular style window on the screen. The data object can include a data item, comprising text data, one or more units specifying one or more portions of the text data to be displayed in the style window, and an identifier corresponding to a particular display function to be used in displaying the text data. The display function can be invoked to determine a potential text string to display based on the text data, the one or more units, and one or more rules corresponding to the particular display function. Additional text
(Continued)

strings can be generated to obtain a text string that is shorter than or equal to a maximum length for the data item.

20 Claims, 11 Drawing Sheets

(51) Int. Cl.
    *G06F 17/24*           (2006.01)
    *G06F 3/14*            (2006.01)
    *G06F 1/16*            (2006.01)
    *G06F 3/0488*        (2013.01)

(52) U.S. Cl.
    CPC .............. *G06F 17/21* (2013.01); *G06F 17/24* (2013.01); *G06F 17/248* (2013.01)

(58) Field of Classification Search
    CPC .... G06F 3/0488; G06F 17/211; G06F 17/248; G06F 3/14; G06F 9/451; G06F 9/445
    See application file for complete search history.

(56) References Cited

U.S. PATENT DOCUMENTS

| | | | |
|---|---|---|---|
| 5,691,708 A * | 11/1997 | Batchelder | G06F 16/345 340/7.29 |
| 5,857,790 A * | 1/1999 | Gutsell | B41J 3/01 400/61 |
| 6,334,133 B1 | 12/2001 | Thompson et al. | |
| 6,871,320 B1 * | 3/2005 | Morihara | H03M 7/3084 715/236 |
| 6,907,582 B2 | 6/2005 | Stanley | |
| 7,913,184 B1 * | 3/2011 | Zhang | G06F 17/243 715/224 |
| 7,954,064 B2 | 5/2011 | Forstall et al. | |
| 8,588,033 B2 * | 11/2013 | Pozzo Di Borgo | G04C 3/002 345/173 |
| 8,930,824 B2 | 1/2015 | Bennett | |
| 9,916,075 B2 * | 3/2018 | Chen | G06F 17/214 |
| 9,996,157 B2 * | 6/2018 | Chaudhri | G06F 3/0412 |
| 10,073,590 B2 * | 9/2018 | Dascola | G06F 3/0482 |
| 10,175,866 B2 | 1/2019 | Block et al. | |
| 10,313,505 B2 * | 6/2019 | Omernick | G06F 1/1626 |
| 10,379,497 B2 | 8/2019 | Block et al. | |
| 2002/0029160 A1 | 3/2002 | Thompson et al. | |
| 2003/0058287 A1 | 3/2003 | Stanley | |
| 2003/0103413 A1 | 6/2003 | Jacobi et al. | |
| 2003/0169293 A1 * | 9/2003 | Savage | G06F 3/0481 715/762 |
| 2005/0013199 A1 | 1/2005 | Danks et al. | |
| 2005/0081189 A1 | 4/2005 | Krasikov et al. | |
| 2005/0095067 A1 | 5/2005 | Hirose et al. | |
| 2005/0190652 A1 | 9/2005 | Marhic et al. | |
| 2006/0035628 A1 * | 2/2006 | Miller | H04M 3/493 455/414.3 |
| 2006/0107204 A1 | 5/2006 | Epstein | |
| 2007/0067721 A1 * | 3/2007 | Ur | G06F 3/04892 715/700 |
| 2007/0083827 A1 | 4/2007 | Scott et al. | |
| 2007/0101297 A1 * | 5/2007 | Forstall | G06F 3/04817 715/841 |
| 2007/0255811 A1 | 11/2007 | Pettit et al. | |
| 2007/0260584 A1 * | 11/2007 | Marti | G06F 16/258 |
| 2008/0039008 A1 * | 2/2008 | Chen | H04L 12/1895 455/3.01 |
| 2008/0062819 A1 * | 3/2008 | Kelly | G01S 19/19 368/11 |
| 2008/0184158 A1 * | 7/2008 | Selig | G06F 17/243 715/781 |
| 2008/0188210 A1 * | 8/2008 | Choi | G04G 9/0076 455/414.3 |
| 2008/0263174 A1 * | 10/2008 | Manson | H04L 67/18 709/217 |
| 2009/0049060 A1 | 2/2009 | Konik et al. | |
| 2009/0237715 A1 | 9/2009 | Kasatani | |
| 2009/0327871 A1 * | 12/2009 | Wolf | G09G 5/005 715/243 |
| 2010/0145676 A1 * | 6/2010 | Rogers | G06F 17/211 704/9 |
| 2010/0251139 A1 * | 9/2010 | Vance | G06Q 10/109 715/753 |
| 2010/0313154 A1 | 12/2010 | Choi et al. | |
| 2011/0012930 A1 | 1/2011 | Davis et al. | |
| 2011/0025719 A1 | 2/2011 | Yanase | |
| 2011/0066971 A1 * | 3/2011 | Forutanpour | G06F 9/451 715/788 |
| 2011/0099508 A1 | 4/2011 | Liu et al. | |
| 2011/0185029 A1 | 7/2011 | Jain et al. | |
| 2011/0193878 A1 | 8/2011 | Seo et al. | |
| 2011/0202883 A1 * | 8/2011 | Oh | G06F 3/0481 715/846 |
| 2012/0208593 A1 * | 8/2012 | Yang | G06F 3/0481 455/556.1 |
| 2012/0324390 A1 | 12/2012 | Tao et al. | |
| 2013/0024757 A1 | 1/2013 | Doll et al. | |
| 2013/0086019 A1 | 4/2013 | Dantale | |
| 2013/0254705 A1 * | 9/2013 | Mooring | G06F 3/0488 715/784 |
| 2013/0335594 A1 | 12/2013 | Benko et al. | |
| 2014/0109003 A1 | 4/2014 | Saib et al. | |
| 2014/0109114 A1 * | 4/2014 | Mahiddini | G06F 9/547 719/328 |
| 2014/0137036 A1 * | 5/2014 | Han | G06F 3/0482 715/798 |
| 2014/0143784 A1 * | 5/2014 | Mistry | G06F 15/0208 718/102 |
| 2014/0189584 A1 * | 7/2014 | Weng | G06F 1/163 715/808 |
| 2014/0250374 A1 | 9/2014 | Ohki et al. | |
| 2014/0279278 A1 | 9/2014 | Wijaya et al. | |
| 2014/0325374 A1 * | 10/2014 | Dabrowski | G06F 9/451 715/744 |
| 2015/0058744 A1 | 2/2015 | Dhingra et al. | |
| 2015/0193418 A1 * | 7/2015 | Koska | H04L 67/10 715/223 |
| 2015/0199120 A1 * | 7/2015 | Kim | G06T 11/60 715/799 |
| 2015/0248235 A1 * | 9/2015 | Offenberg | G06F 3/04886 715/773 |
| 2015/0355830 A1 * | 12/2015 | Chaudhri | G06F 3/0481 715/738 |
| 2016/0011868 A1 * | 1/2016 | Frenkiel | G06F 8/73 717/123 |
| 2016/0073230 A1 * | 3/2016 | Rahman | H04W 4/029 455/456.3 |
| 2016/0147795 A1 | 5/2016 | Tan | |
| 2016/0328174 A1 | 11/2016 | Uchimura et al. | |
| 2016/0350060 A1 * | 12/2016 | Park | G06F 17/24 |
| 2017/0206187 A1 * | 7/2017 | Levi | G06F 17/211 |

FOREIGN PATENT DOCUMENTS

| | | | |
|---|---|---|---|
| EP | 2487578 A1 | | 8/2012 |
| EP | 2733608 A2 * | | 5/2014 |
| EP | 2733608 A2 | | 5/2014 |
| EP | 2921946 A1 | | 9/2015 |
| WO | 2016196171 | | 12/2016 |
| WO | 2016196225 | | 12/2016 |
| WO | 2016196434 | | 12/2016 |

OTHER PUBLICATIONS

International Search Report and Written Opinion dated Oct. 28, 2016, in PCT/US2016/034458, 17 pages.
International Search Report and Written Opinion dated Aug. 22, 2016 in PCT/US2016/034271, 12 pages.
PCT/US2016/034458, "Invitation to Pay Add'l Fees and Partial Search Report", dated Sep. 2, 2016, 6 pages.

(56) References Cited

OTHER PUBLICATIONS

U.S. Appl. No. 14/872,136, "First Action Interview Pilot Program Pre-Interview Communication", dated Dec. 28, 2017, 5 pages.
PCT/US2016/034961, "International Preliminary Report on Patentability", dated Dec. 14, 2017, 9 pages.
U.S. Appl. No. 14/872,136, "Final Office Action," dated May 31, 2018, 16 pages.
Notice of Allowance issued in U.S. Appl. No. 14/872,125, dated Mar. 25, 2019 in 10 pages.
Final Office Action issued in U.S. Appl. No. 14/872,125, dated Sep. 6, 2018 in 13 pages.
Notice of Allowance in U.S. Appl. No. 14/872,136, dated Sep. 19, 2018, 6 pages.
First Action Interview Pilot Program Pre-Interview Communication issued in U.S. Appl. No. 16/230,096, dated Sep. 20, 2019 in 4 pages.

\* cited by examiner

1A. Wednesday, December 23
1B. Wednesday, Dec 23
1C. Wed, Dec 23
1D. Wed 23
1E. 23

FIG. 9A

2A. January 23, 2015
2B. January 23
2C. Jan 23
2D. 23

FIG. 9F 1A. 2hrs 23mins
1B. 2hr 23min
1C. 2h 23m

FIG. 9G

2A. +59 MINUTES
2B. +59 MINS

FIG. 9H

API FOR SPECIFYING DISPLAY OF COMPLICATION ON AN ELECTRONIC WATCH

CROSS-REFERENCES TO RELATED APPLICATIONS

The present application claims the benefit of and priority to U.S. Provisional Application No. 62/171,955, filed Jun. 5, 2015; and is related to commonly owned U.S. Provisional Application No. 62/171,952, filed Jun. 5, 2015; and U.S. Provisional Application No. 62/171,978, filed Jun. 5, 2015, the entire contents of which are incorporated herein by reference for all purposes.

BACKGROUND

Small screens provide problems for displaying text. For example, the desired amount of text may be too long for display screen. The problems can be particularly acute on a watch those displaced screen is quite small. The problems can be further exacerbated when the text is to be displayed in a complication of the watch, where a complication resides within a portion of the display screen of the watch. One could allow a client application to fully format the text, but such a process can be inefficient, particularly for a small device with limited resources.

BRIEF SUMMARY

Embodiments of the present invention provide systems, methods, and apparatuses for displaying text on a screen of a computing device. For example, a client application can provide a data object for a particular style window on the screen. The data object can include a data item, comprising text data, one or more units specifying one or more portions of the text data to be displayed in the style window, and an identifier corresponding to a particular display function to be used in displaying the text data. The display function can be invoked to determine a potential text string to display based on the text data, the one or more units, and one or more rules corresponding to the particular display function. Additional text strings can be generated to obtain a text string that is shorter than or equal to a maximum length for the data item.

Other embodiments are directed to systems, portable consumer devices, and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIGS. 9A-9H shows various designs for reducing a length of text in a data item according to embodiments of the present invention.

TERMS

Figure 1A:
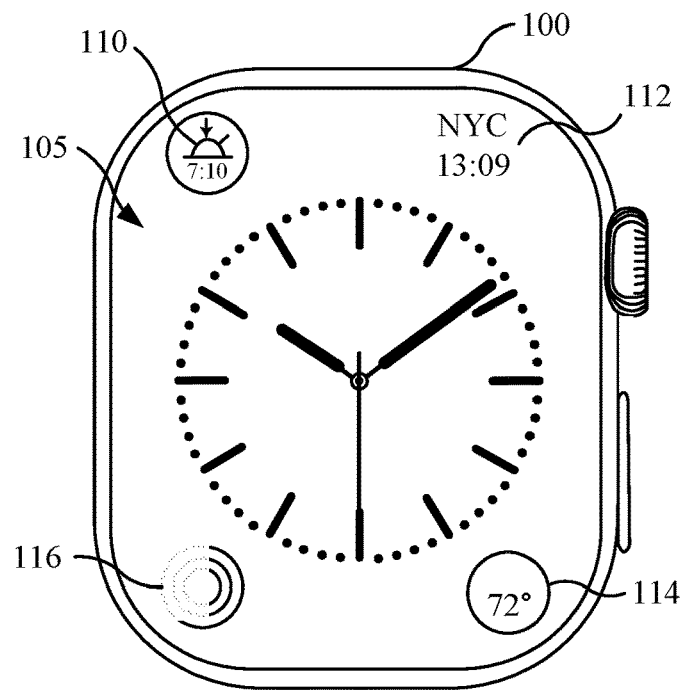
FIG. 1A shows a first example watch face of an electronic watch according to embodiments of the present invention.

A watch (or watch device or electronic watch) corresponds to any device that displays time. An example is a wristwatch or a pocket watch. A watch can have configurable watch faces.

A "watch face" corresponds to a particular layout for displaying a time and any complications. A device may have multiple watch faces defined for use. A "watch face" may be defined with time displayed in a particular manner, and include one or more "style windows."

A "complication" is an item on a watch face that does not tell time, such as date, weather, atmospheric pressure, calendar information, etc. A particular complication corresponds to a particular application running on the device displaying the watch face. A complication can be displayed within a particular "style window" of a watch face. A "style window" can correspond to a part of a watch face that is designated to display a complication. In some embodiments, a user can configure a watch face by determining which data (e.g., by selecting a watch application) is to be displayed in a particular style window.

"Templates" can be defined for "style windows." A style window can have one or more templates, with each template specifying data to be displayed in a different manner. Different data can also be displayed, or the same data, but displayed in a different manner.

A "companion" (or companion device) can correspond to any device that communicates with the watch. As examples a companion can correspond to a phone, a tablet, or a laptop computer. A companion can also be a server computer when the watch can communicate with a network. A "watch application" on the watch can have a corresponding "companion application" on the companion. For example, a new application on the companion can have a watch version on the watch, and the companion application can communicate with the watch application, e.g., via a "companion extension" that is part of the companion application.

A "complication controller" for a companion application can control a sending of updated complication data to the watch. The complication controller can be included in an extension of the companion application, where the extension enables communication on the watch.

A "travel time" refers to a past or future time that is selected by a user. The travel time would be different than a current time, and historical/future data corresponding to a selected travel time can be retrieved from memory of the watch to display to the user.

DETAILED DESCRIPTION

Various client applications may want to display text in portions of a screen of a computing device. Different client applications may be configured to display text in a same window at different times. For example, different watch applications can be assigned to display text as complications in a style window at different times.

When displaying text, a client application can be constrained to a small amount of allotted space. In such situations, a client application may not be able to properly convey the desired information. Further, a client application may not have any efficient mechanism to specify how to format the text, e.g., for instructing a system routine how to display the text. A client application may have no way to manage which rules are for shortening the text when the text is too long.

Embodiments can provide a mechanism for a client application to efficiently specify how text is to be displaying, including specifying which rules to use in determining shorter versions of the text to display, so as to maintain the readability of the shorter version. For example, a client application can provide a data item, including text data, one or more units specifying one or more portions of the text data to be displayed, and an identifier corresponding to a particular display function to be used in displaying the text data. The display function can be invoked to determine a potential text string to display based on the text data and the one or more units. Additional text strings can be generated to obtain a text string that is shorter than or equal to a maximum length for the data item.

In some embodiments, the computing device is a watch, and the text is to be displayed in a style window of a watch face as a complication. Complications are described below, as well as communications between a watch and a companion device for obtaining new data for a watch application to display as a complication. Templates for use in displaying complications (and other text data) is then described. Then, embodiments involving the specification of how to display text of data item(s) of a data object are then described.

I. Complications

Complications can allow a user to efficiently see other data besides time when looking at a watch face. On mechanical watches, the complications operate by moving gears in the mechanical watch that provide periodic information. In some embodiments, the electronic watch can be configured with a multitude of different complications, where data can be obtained from other devices. New applications that are installed on the watch can be used to add new complications to certain style windows of various watch faces.

A. Example Watch Faces with Complications

FIG. 1A shows a first example watch face 105 of an electronic watch 100 according to embodiments of the present invention. Example watch face 105 shows a mechanical-style watch face with a minute hand and an hour hand. Example watch face 105 includes four complications 110, 112, 114, and 116.

Complication 110 shows a time for sunrise for the current day, or potentially for a following day. As shown, sunrise is to be at 7:10. An icon showing half the sun being visible indicates that the time is for sunrise. Complication 110 thus includes time data that changes and includes an image, which is typically static. Complication 110 could also be configured to show a sunset, or both a sunrise and a sunset. A direction of an arrow can designate sunrise or sunset. At some time after sunrise, complication 110 could change to show a time for sunset, and similarly after sunset, showing a time for sunrise for the next day.

Complication 112 shows a time for a particular location, New York City in this example. Here, the information for complication 112 can be derived from the current time of the current location of the watch. Other complications can require obtaining data from another device, e.g., a companion device.

Various complications may be used for different windows of a watch face. For example, for the window in the upper right corner, the complication could be a moon phase for how much of the moon will be visible that night. The moon phase can change periodically, e.g., once a day at a prescribed time. New data can be received at the prescribed time, and complication 112 can be updated. Complication 110 can also be updated at a prescribed time once new data has been received.

Complication 114 shows a current weather temperature, e.g., an outside temperature near electronic watch 100. By current, this is the most recent weather temperature that was received. A temperature can be received from a weather application running on the watch or a companion device, which can obtain the temperature from a server that is in communication with a weather service. Such a weather service can be a private or public service that can have weather sensors near a location of electronic watch 100.

How often a new temperature is received can depend on various factors, such as a current battery level of electronic watch 100, power consumption to obtain the new weather temperature, and user preference as to how often the user would like to update the weather temperature. In various embodiments, the update of any complication can depend on one or more of these and other factors.

Complication 116 can show activity information for electronic watch 100. As shown, there are three concentric rings, each having a different amount highlighted. Each ring can correspond to a different type of activity. Examples of types of activity include moving (e.g., walking), exercising (e.g., quicker motion than moving, such as running), and standing. The amount highlighted in a ring can correspond to an amount of that activity for a day completed relative to a goal amount. A completed ring can correspond to the goal amount being achieved.

Figure 1B:
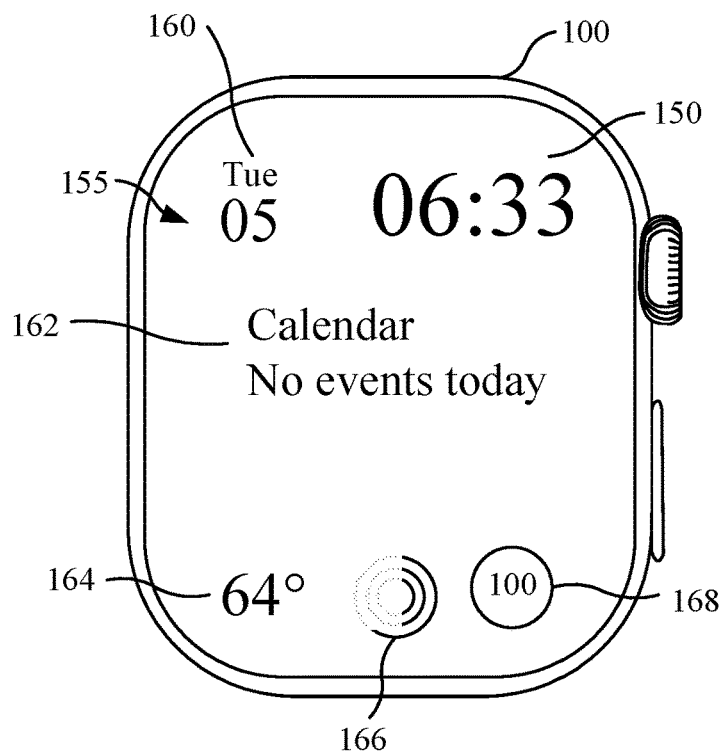
FIG. 1B shows a second example watch face of an electronic watch according to embodiments of the present invention.

FIG. 1B shows a second example watch face 155 of an electronic watch 100 according to embodiments of the present invention. Second example watch face 155 corresponds to a modular watch face that shows digital time. Window 150 shows digital time with four digits. Various types of digital time can be shown, e.g., on a 24-hour basis or on a 12-hour basis with AM and PM designated. Example watch face 155 includes five complications 160, 162, 164, 166, and 168.

Complication 160 shows a day of the week and the date of the month. Thus, complication 160 shows two pieces of information. Such information can be generated by an application on electronic watch 100, e.g., by a calendar application, and provided to second example watch face 155. In some embodiments, the exact format for displaying the day and date can be configured by a user for a particular watch face or changed by selecting a different watch face.

Complication 162 shows calendar event information. Complication 162 can show various information, such as a day of the week, date, and/or time, along with information about any calendar events associated with the day and/or time. As another example, complication 162 can show the word "calendar" to indicate the type of data. Calendar event data can be shown for the associated day and/or time of day. For example, complication 162 can show a title of an event starting at a time, which is also displayed. Another example includes displaying a number of events after a certain time.

As shown, complication 164 shows a current weather temperature. Complication 166 shows concentric rings for an amount of completion of activity. Complication 168 shows a battery level. Other example complications include an alarm time, a timer (different symbol from the alarm), a stopwatch, a world clock to get time in another time zone (e.g., for a specific city), and stock quotes.

Further examples can include any application, e.g., by a third party, that can provide complication data in a template format. Such third party complications can be formed from various applications, such as for news, social media, sports, and weather.

In some implementations, certain complications can receive updated data (e.g., in a template format) and a display routine for a watch face can determine how to display the updated data. In some embodiments, once a time travel mode has been enabled, a complication can change in response to user input for selecting a historical and/or future time. Such new data can be received by the complication from an application running on the watch or from an application running on another device, which may be communicated with the watch application.

B. Watch Face with Style Windows

On mechanical watches, the set of complications on the watch are fixed. If one wanted different complications, then a new watch would need to be purchased. Whereas on an electronic watch, a user can select a particular watch face from a list of available watch faces. Different watch faces can have different layouts of complications, different numbers of complications, and different sizes of windows for displaying the complications. The windows of a watch face can be referred to style windows, where a particular watch face can correspond to a particular style.

Figure 2:
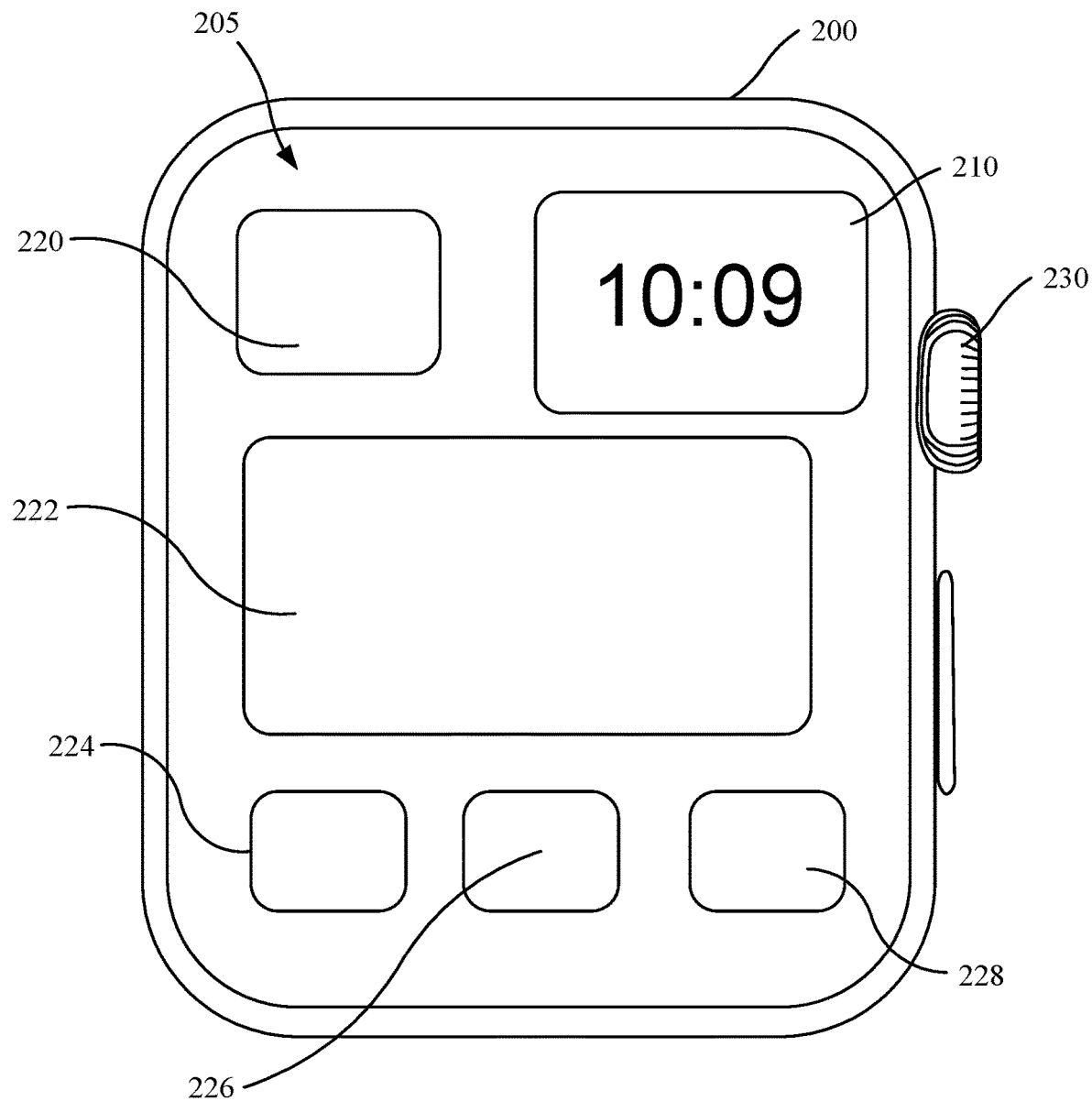
FIG. 2 shows a modular watch face of an electronic watch according to embodiments of the present invention.

FIG. 2 shows a modular watch face 205 of an electronic watch 200 according to embodiments of the present invention. Modular watch face 205 includes a time window 210 and five style windows 220, 222, 224, 226, and 228 for complications. Modular watch face 205 is shown with a particular layout of complications. Different style windows can be of different sizes and show different amounts of data. For example, style window 222 can show more data as it is larger than style windows 224, 226, and 228. Thus, a user might want to configure style window 222 to show a complication corresponding to an application that needs to show more than one piece of data, e.g., show more than one number.

One or more display windows (which may correspond to a style window) of a watch face can overlap with each other such that a graphic from one display window can be overlaid on top of a graphic from another display window. For example, time window 210 can show time over a graphic (e.g., a position of the Earth or the sun) that corresponds to the current time.

In some embodiments, a user can enter a customize mode where a complication can be selected for displaying in a particular style window. Electronic watch 200 can include a digital crown 230 for selecting a complication to appear in a selected window. Different style windows can have different templates for displaying (formatting) information. A same style window can be used for more than one watch face. Different style windows can have different shapes and different aspect ratios. A same style window could have different sizes.

Example style windows for complications include: small (e.g., for analog watch faces, such as 112), small modular, large modular, small utility (e.g., rectangular for analog watch faces), large utility, and circular. A style window can be considered a container for displaying a complication. Thus, a same application can display different information in different types of style windows, resulting in different complications for different style windows of a same watch face. Further examples of watch faces are below.

C. Other Example Watch Faces

An astronomy watch face can display one or more graphic complications for the solar system (e.g., position of moon, sun, Earth, or other planets), day, date, and current time. In some implementations, there are no complications to customize, while complications can be customized in other implementations. In some embodiments, one or more of the graphic complications can change in response to user input, e.g., moving digital crown 230. For example, a user can move the planets forward and backward in time by turning the digital crown 230.

A solar watch face can display the sun's current position in the sky on a curved line based on a current location and the time of day. In some embodiments (e.g., using a digital crown), a user can move the sun across the curve to see it at dusk, dawn, zenith (solar noon), sunset, and darkness (solar midnight). The face's colors can change over the course of the day to match the time.

In some embodiments, time can be displayed using such physical features, with no digital time or analog time being displayed. For example, a position of the sun can indicate a time, and thus correspond to time information. Other complications can then be added to such a watch face.

A chronograph watch face can be modeled on analog watches with two hands: one for total time and a second for lap times. A customizable timescale can measure long and short time periods. Different watch faces can have different complications available. For example, a chronograph watch face might have a particular set of complications available, such as: date, calendar, moon phase, sunrise and sunset, weather, stocks, activity summary, alarm, timer, battery life, and world clock. A particular set of third party complications can also be used.

A color watch face can provide the time in a range of bright colors that can be changed to suit a user's mood, e.g., using a digital crown to choose a color. In some embodiments, watch faces with options for complications can allow a user to not select a complication for a style window, thereby leaving the window blank. Some watch faces can add pictures or a character in a representation of an analog watch face. Further, a graphic complication can provide motion video, e.g., of an object in nature.

A watch can allow configuration of any watch face, and a user can save a particular configuration for a customized watch face. Such configuration can include settings such as color and layout of the particular watch face. The customization can also include particular complications chosen for a configuration. In one example of customizing a watch face, a display screen of the watch can be firmly pressed, and then a user can swipe to a particular direction to access an add input (e.g., a +icon). A user can swipe up and down to browse the faces and tap the one the user wishes to add. The user can then customize the face to the user's preferences. A watch face can be deleted by firmly pressing the display, swiping to the face not wanted, then swiping up and tapping delete.

II. Communication with Companion

An electronic watch can communicate with a companion device to obtain updated information, e.g., for a complication. For example, a sports application can execute on a companion device, retrieve sports data from a server, and provide the sports data to the watch for displaying in a complication. Various mechanisms can exist on the companion device and the watch to control how and when such complication data is provided.

To obtain new complication data, a companion application may need to be woken up (launched). Embodiments can determine triggers for launching a companion application, e.g., based on previous uses of the companion application or a corresponding watch application. Once a particular companion application is launched, the companion can instruct the particular companion application to obtain new data, e.g., from a server. New complication data can also be pushed by a server. Modules on the companion can determine when to send the complication data, e.g., based on any one or more of usage of both devices, power states of both devices, and user preferences. A watch application and/or system routines on the watch can process the new complication data, e.g., determining how to display. And, then the new complication data can be displayed.

A. System Diagram

Figure 3:
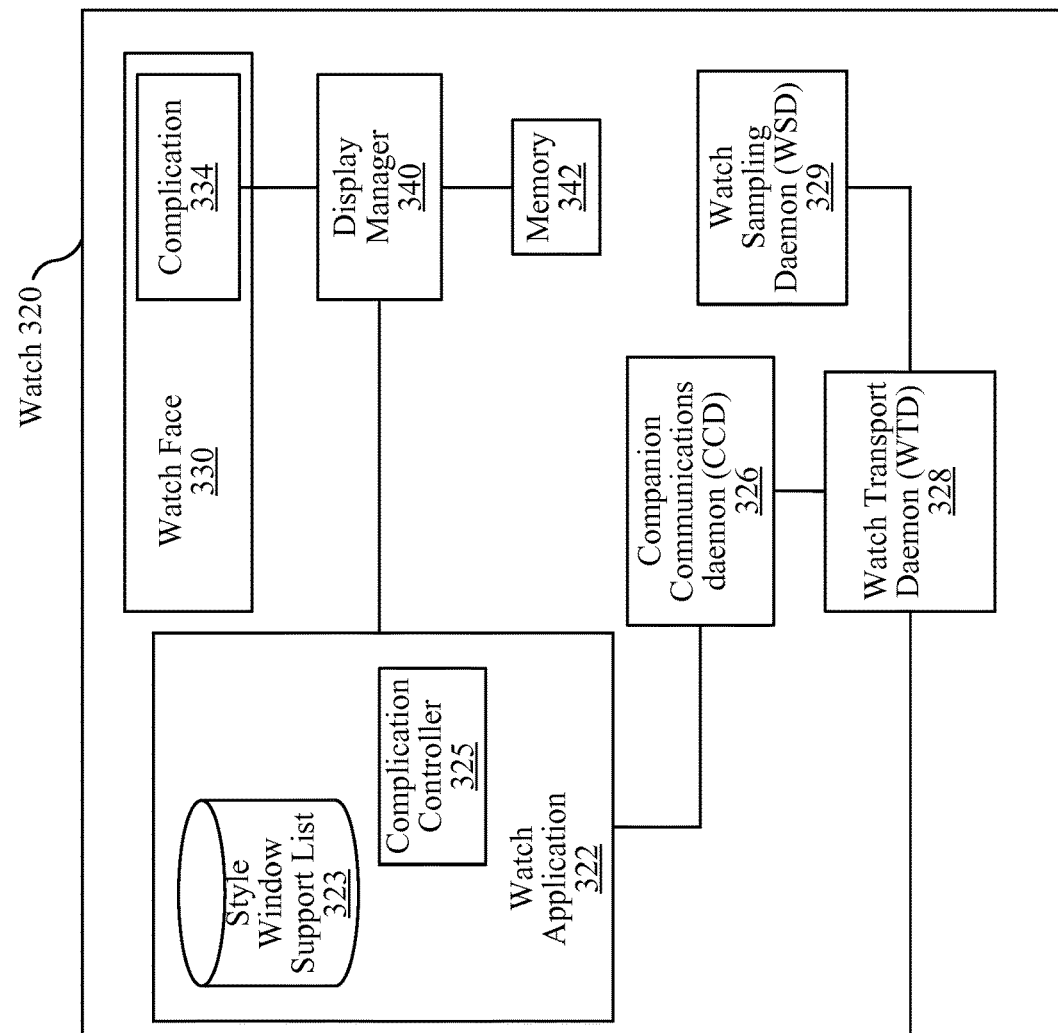
FIG. 3 shows a companion in communication with a watch according to embodiments of the present invention.
Figure 3:
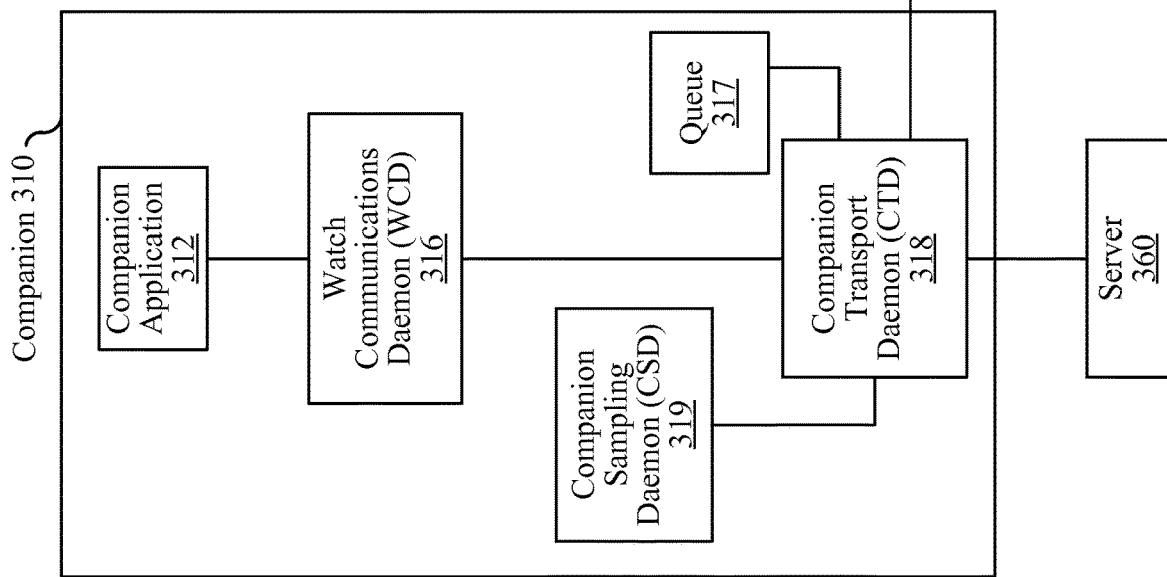

FIG. 3 shows a companion 310 in communication with a watch 320 according to embodiments of the present invention. Lines in FIG. 3 correspond to communications that occur in either direction.

An application package for a particular software application can include software components for companion 310 and for watch 320, e.g., a companion application 312 and a watch application 322, respectively. For example, a news application from a particular publisher (e.g., for a particular newspaper, TV show, or website) can have one component that runs on companion 310 and a corresponding component that runs on watch 320. In addition, the software application can include an application extension (not shown). The application extension can be used for communications between the watch application 322 and the companion application 312. The application extension can execute on the watch or the companion. These software components can execute independently or together, e.g., as part of providing updated complication data to watch 320. In other embodiments, the software components can be downloaded separately to the two devices. Companion application 312 and watch application 322 are examples of client applications.

Companion application 312 can function as a standalone application that operates on companion 310 without any need to interact with watch 320. Companion application 312 may include an extension that is used to communicate with watch 320. Such an extension could be downloaded and installed separately from companion application, e.g., to provide add-on functionality.

A watch communications daemon (WCD) 316 can determine how communications are to occur with watch 320. WCD 316 can determine a particular manner for sending any data (e.g., complication data) from companion application 312 to watch 320. For example, WCD 316 can determine which watch applications are currently running, and only send data to a particular watch application when that watch application is running. If the particular watch application is not running, then the data can be queued. As other examples, WCD 316 can perform background process for sending data (e.g., files) according to specified rules, e.g., send data for a specified amount of time, and when not finished then pause (e.g., so that other data can be sent).

WCD 316 can also process any data such that the data is in a format that can be determined by watch 320. For example, companion application 312 may send the data in a same format regardless of the destination device, and WCD 316 can translate the data into a format suitable for a watch. For example, only higher level communication options may be exposed to the companion applications, and all of the lower-level options available to a companion transport daemon (CTD) 318 may not be exposed to the companion application. WCD 316 can perform the translation between the higher-level concepts in low-level features of CTD 318. Other daemons can do processing for other types of devices.

WCD 316 can also translate data received from watch 320 into a format that is readable by companion application 312, or any companion application. WCD 316 can also interpret one or more request commands from watch 320, where the request commands request data (e.g., complication data) from companion application 312, or other companion applications. WCD 316 can then send a request for the data in a suitable format to the companion application. WCD 316 can interact with an application manager (not shown) that can launch a companion application, if needed.

CTD 318 can transmit data to and receive data from watch 320. WCD 316 can provide logic for determining specifically how to communicate with watch 320, while CTD 318 can communicate with various other devices besides a watch. CTD 318 may be an identity services daemon, e.g., as described in U.S. patent application Ser. No. 14/475,060 entitled "Proxied Push" filed Sep. 2, 2014, the disclosure of which is incorporated by reference in its entirety. WCD 316 and CTD 318 can be part of an operating system of companion 310.

If WCD 316 determines that data should not be sent, WCD 316 may decide not to provide the data to CTD 318. WCD 316 can do this in a variety of ways. For example, WCD 316 may not inform companion application 312 the data should be sent. As another example, WCD 316 can inform companion application 312 that the data cannot be sent, and thus companion application 312 can wait until later to try and send the data. In yet another example, WCD 316 can queue the data. WCD 316 can further track which data has not been sent, and potentially remind companion application 312 at a later time.

A companion sampling daemon (CSD) 319 can track interactions of the user with the device as events, and determine predictive interactions and respond proactively. CSD 319 can be in communication with other modules on companion 310, e.g., an application manager. For example, CSD 319 can determine when a particular companion application should retrieve data for sending to watch 320, e.g., when to obtain new complication data as part of an update. As another example, CSD 319 can track user interactions with watch 320 (e.g., by receiving tracking information from watch 320) and determine when to retrieve and send data to watch 320. CSD 319 can perform such determinations by creating models and determining prediction probabilities for how a user might interact with companion 310. Further details for sampling demons and a transport daemon (e.g., a push daemon) can be found in U.S. Patent Publication 2014/0366041.

In some embodiments, CTD 318 can queue data in queue 317 to preserve battery life of watch 320, and send the queued data when other data is requested by watch 320 or when other data is sent to watch 320 (e.g., when certain high-priority data is sent or a sufficient amount of data is to be sent). For example, certain data (or certain companion applications) can be flagged to allow sending of data at times when other data would not be sent, e.g., regardless of a current state of watch 320. When CTD 318 cues the data, WCD 316 can store a record of what the content is, so that when a response is received in response to a particular message, the response can be associated with a particular message that was sent.

A watch transport daemon (WTD) 328 on watch 320 can communicate data sent to/from CTD 318. A companion communications daemon (CCD) 326 can provide protocols for specifically communicating with companion 310. CCD 326 can provide translation of communications to and from watch applications, such as watch application 322. A watch sampling demon (WSD) 329 can track previous user interactions with watch 320 in a similar manner that CSD 319 can track user interactions with companion 310. WSD 329 can also make predictions for how a user might interact with watch 320. In response to such predictions, WSD 329 can cause data to be requested from companion 310.

Watch application 322 can include a style window support list 323 that identifies the style windows that watch application 322 supports. Certain watch applications may only support certain style windows. In some embodiments, if a watch application supports a style window, the support applies for all watch faces that use that particular style window. In one embodiment, watch application 322 can run code from a developer in an extension, and the system can provide code that ensures data from the developer's code is interpreted properly by system modules, such as display manager 340.

A complication controller 325 can determine how and when complication data is sent to a display manager 340, which can manage displaying of data on a screen of watch 320. Complication 334 can be generated as an object on a watch face 330, and complication 334 can be specifically associated with watch application 322. The complication data can be sent from companion application 312 through various components over to watch application 322. In some embodiments, complication controller 325 can determine a specific template corresponding to a style window being used to display complication 334.

Complication controller 325 can create a complication data object according to the selected template, and send the complication data object to display manager 340. Display manager 340 can identify the template that is used to identify the new complication data. Based on the specific template used, display manager 340 can determine how to display the new complication data, e.g., using other settings for watch face 330, such as color or presentation style.

In some embodiments, when watch application 322 is launched in the foreground, a command can be sent to companion 310 to launch companion application 312 so that any data can be transferred between the two applications. In one example, watch application 322 can launch and receive user input to transfer one or more files from companion 310 using companion application 312. When watch application 322 is only running in the background, watch application 322 can be disabled from launching companion application 312.

Companion 310 and/or watch 320 can track which applications currently provide complication data to watch face 330. Such information can be used to determine which applications can transfer data between companion 310 and watch 320. Further, watch 320 can determine which watch applications can support a particular style window, e.g., by looking at the support lists in each of the watch applications. Such information can be used when configuring a watch face.

Complication controller 325 can provide a preferred data refresh rate for how often the data in a complication is to be refreshed. This data refresh rate can be used to determine how often to request data from companion 310, or how often companion 310 is to send data to watch 320. In various embodiments, CSD 319 and WSD 329 can use the data refresh rate along with other factors (e.g., power state and other predicted user interactions) to determine how often to update complication 334 on watch face 330. Thus, the preferred refresh rate can be overridden based on system considerations (power, etc.). The preferred refresh rate can be defined in various ways, e.g., a time for a next update, an amount of updates per time period, an amount of data per time period, and like, as well as a combination thereof. In some embodiments, complication controller 325 can make an interactive request to obtain new complication data.

Display manager 340 can show the icons of watch apps and host the watch faces. Display manager 340 can act as a carousel application to provide information when needed. In some embodiments, display manager 340 can access complication data in a memory 342, which may store historical and/or future complication data. Memory 342 can be various types of memory and include different memory modules of different types for different purposes. For example, memory 342 can include a cache that acts as operating memory for currently running processes and include a persistent memory (e.g., flash memory) that can store data after a device is turned off.

Display manager 340 can know the companion applications that can provide complication data to watch face 330, and decide, based on resources, when to wake up a particular companion application. In other implementations, such a determination can be made by WSD 329, which may be in communication with display manager 340, or made by both. Display manager 340 can determine how long to cache the data in memory 342 to keep watch face 330 responsive, but also not bogged down with excessive caching.

Companion application 312 can get updated complication data from server 360. Different companion applications can correspond with different servers. Thus, a server might provide updated data for a particular complication. A server might be associated with a particular topic (also called a feed).

In one example, assume there are two watch faces with five different complications on each watch face, and a user switches to a different watch face. A list of active complications can be updated on companion 310 and/or watch 320. Companion 310 can inform any servers associated with an active complication (e.g., based on active topics), and inform any servers that were associated with an active complication but are no longer. The servers can now change a deliberate priority for pushes to companion 310 based on the active state of a complication on watch 320. For example, a server for a complication on an active list would have pushes to companion 310 be low priority. Such low priority data can be sent to watch 320 only when it is awake or when other data is sent, as can data sent from server 360 to companion 310, while messages that are for the currently active complications can get a special treatment where they can wake up watch 320. In some implementations, high priority messages from server 360 can wake up companion 310, whereas lower priority ones can wait until companion 310 wakes up.

In some embodiments, messages with a regular or low priority on companion 310 can be sent to watch 320 when the watch requests data, or other data is being sent. For example, a user may have requested the file to be transferred, and other messages can be sent at that time since watch 320 is known to be awake. Messages can increase in priority the longer they wait in the queue, and finally be transferred immediately when a connection is made to watch 320, if the amount of time has become sufficiently long.

In other embodiments than shown in FIG. 3, companion application 312 can have an app extension that is designated for communicating with a watch. The application package can include a companion application, an app extension, and a watch application, which may include an interface file specifying how data of the watch application is displayed. In some embodiments, companion 310 can help to install a watch application on watch 320 by downloading the application package and providing the watch application to watch 320.

B. Getting Updates on Companion

New data destined for watch 320 can be received at companion 310 in a variety of ways. The corresponding companion application can be launched to obtain the data. The companion application can be launched in response to a push from a server, e.g., with the latest score of a sports game. As another example, a companion application can be launched in response to a signal from CSD 319, which may be determined that the user is likely to use the companion application and thus the companion application can be launched in the background. Once the companion application is launched, data can be obtained by a push or pull from the server. This data can then be sent over to watch 320 according to protocols described above.

In one embodiment, a preferred refresh rate can be sent from watch 320 to companion 310, and a corresponding companion application can periodically fetch the new data from a server. For example, current weather information can be retrieved every hour. In some implementations, CSD 319 may still determine whether or not the preferred refresh rate is going to be honored. A priority of a particular companion application might be used to determine whether to honor the preferred refresh rate. The preferred refresh rate can be based on a developer's settings and/or user input. Thus, CSD 319 may give more weight to the preferred refresh rate for companion applications with higher priority.

1. Background Process on Companion

In some embodiments, a companion application can choose to opt into being launched in the background to obtain new complication data to send to a watch. The companion application can be periodically launched based on an analysis, e.g., by CSD 319. A companion application can be allotted a certain budget for an amount of data and/or power that can be used in updating data on the watch (e.g., complication data).

As an example background process, CSD 319 can track that a user launches a particular companion application or watch application at a particular time every day, e.g., 9:00 AM. CSD 319 can cause the particular companion application to launch and obtain the new data, and push the new data to the watch. Thus, whether user launches the watch application or views a watch face with a complication corresponding to the watch application, the data is readily available.

2. Pushes from Server

A server can send pushes for things like showing a notification or telling a user that there is new content to fetch. In some embodiments, a server can inform the companion application that there is an update for complication. The message to inform the companion application can include the updated data for the complication. For example, an update to a sports game can be pushed from the server to companion 310, and then push to watch 320.

When a push comes into the companion and is received by WCD 316, the corresponding companion application can be launched. The companion application can process the data, and then send a request to WCD 316 to send any data to watch 320, e.g., send new complication data. Then, depending on any associated scheduling determined by CSD 319, a push message can be sent to watch 320. Watch 320 can receive the push message, and wake up the corresponding watch application. The corresponding complication controller can then provide an updated complication data object to display manager 340 for updating the corresponding complication. The operations on the watch can be the same regardless of how companion 310 obtains the data.

C. Getting Updates to Watch

The companion and watch can exchange information to determine how often to update the complications. In various embodiments, logic in either device can determine an appropriate time for updating the complication data.

In some embodiments, a companion application can send preferences for when and how often the companion application would like to update the complication data, e.g., by specifying a refresh rate. The watch (e.g., by WSD 329 and/or display manager 340) can then determine when to request an update to a complication. The watch can ask the companion for the updated complication data at different points in time, e.g., based on battery level, power consumption, user preferences, and the like. Further, certain actions on the watch can prompt a request from the companion, e.g., when the watch application is launched in the foreground.

In other embodiments, the companion application can determine whether to send the complication data to the watch, e.g., based on preferences received from the watch. The companion application 312 corresponds to an active complication, such a companion application can be allowed more budget for sending messages to the watch.

The refresh rate can vary for different companion applications. For example, some complications can refresh every few minutes for certain periods of time, and other complications may only update a few times a day or less. For example, an application that identifies a birthday would likely refresh no more than once a day. Thus, a companion application may have long periods of downtime with no refreshes. Whereas, a social media application could refresh many times during the day, and a user may want to see many of those refreshes.

Both devices can balance an amount of expected refreshes according to an expected number of refreshes for the complications on an active watch face. In some embodiments, the companion application can have a brief window that may be allowed to update frequently. But, for power reasons, the complications may not be updated frequently for long periods of time.

Figure 4A:
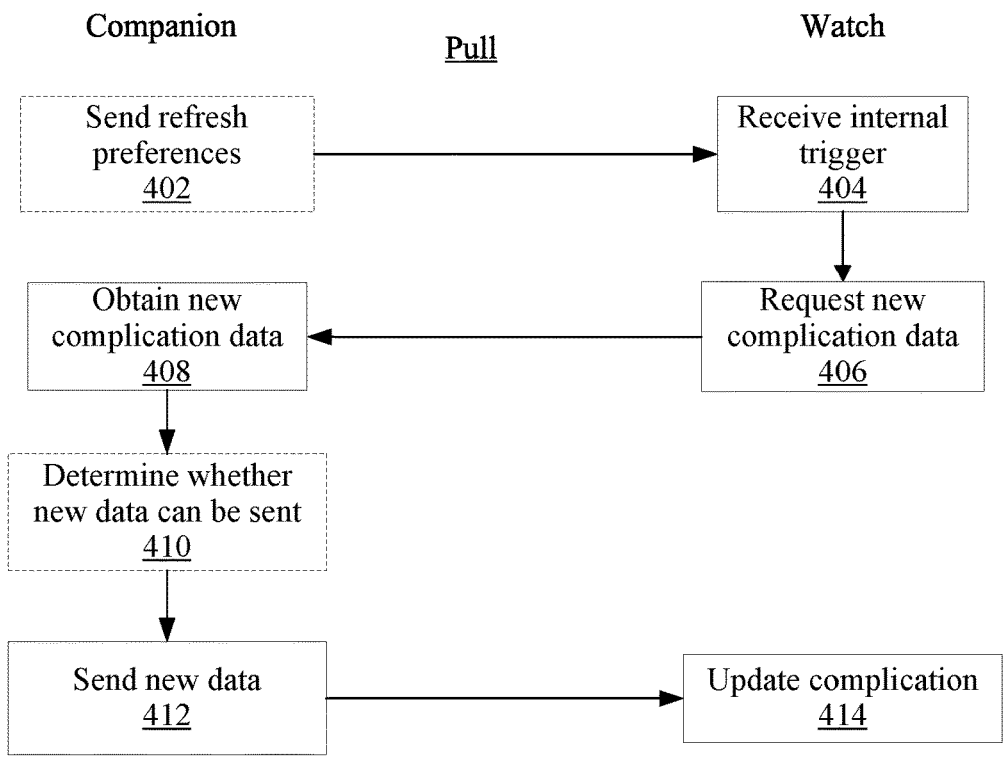
FIG. 4A shows a flowchart of a method where the watch requests an update to complication data from a particular companion application according to embodiments of the present invention.
Figure 4B:
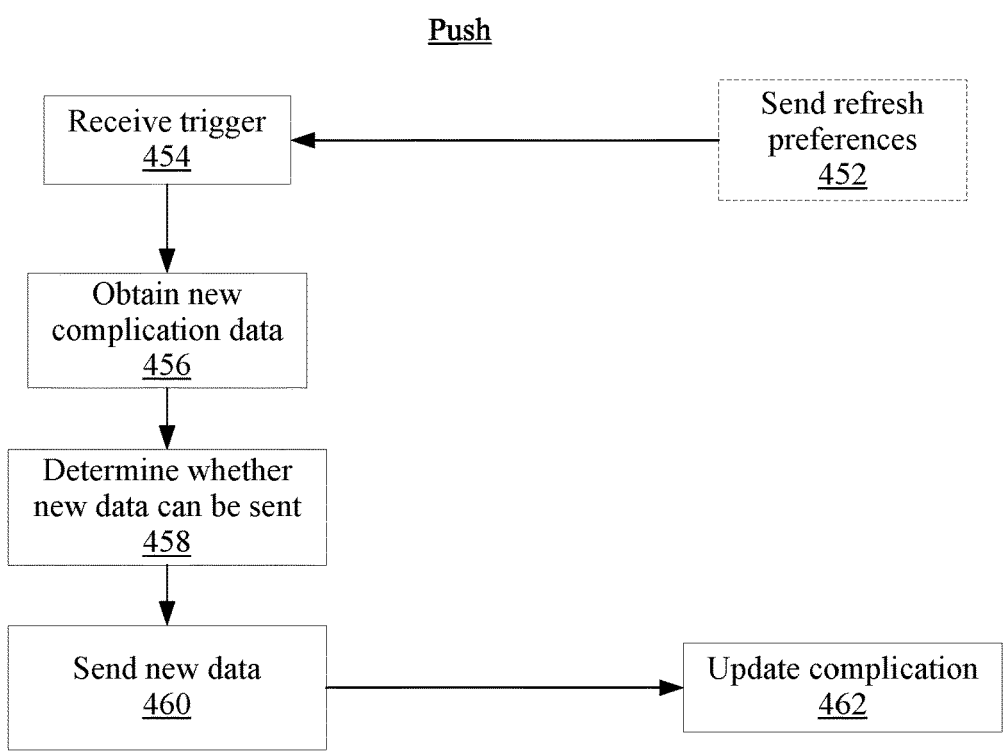
FIG. 4B shows a flowchart of a method where a particular companion application provides an update to complication data to the watch according to embodiments of the present invention.

FIGS. 4A and 4B show flowcharts illustrating steps performed by the companion and the watch for updating applications on the watch with new data.

1. Pull

FIG. 4A shows a flowchart of a method 400 where the watch (e.g., by WSD 329 and/or display manager 340) requests an update to complication data from a particular companion application (app) according to embodiments of the present invention. Various blocks of method 400 can be optional. Method 400 relates to updating a particular complication that corresponds to a particular companion application.

At block 402, the companion application can send refresh preferences. Examples of refresh preferences can include a refresh rate, a starting time for updating complication data (e.g., for a given day or date), and an ending time for updating complication data. The companion application can know that the refresh preferences are simply preferences, and that the actual refresh rate from the watch may differ.

In some embodiments, a complication controller in the companion application can provide the refresh preferences. The complication controller can determine the refresh preferences based on information obtained from the companion app, e.g., expected rates of change of the data and the nature of the data (e.g., certain times the data may be expected to change, as may occur for sporting events).

At block 404, an internal trigger is received. The internal trigger can be generated within the watch, e.g., when it determines a suitable time to update the complication data with a particular companion application. Such a determination can be based on the particular application refresh preferences and a current state of the watch (e.g., battery life, whether in active use by a user, or how much power such the refresh will use), and may be determined by WSD 329. In some implementations, a user can explicitly request an update to a complication, e.g., by selecting via touch or otherwise activating the complication, such as by voice.

At block 406, the watch can request new complication data, e.g., via WTD 328. CTD 318 can identify that the message corresponds to WCD 316, e.g., because the communication came from the watch. WCD 316 can identify the corresponding companion application. Along with the request for the complication data, the watch can ask for any new refresh preferences. Thus, in some embodiments, the companion application can provide new refresh preferences.

At block 408, the companion application can obtain new complication data in response to the request. For example, companion application 312 can retrieve the complication data from a server. In some implementations, the companion application can request the new complication data from a server, or such new complication data can be pushed to the companion, e.g., periodically. In other implementations, the new complication data can already have been stored by the companion. For example, the companion application can periodically request such data from a server, such as obtaining top news stories on a periodic basis. The companion can make a request to the server to determine any new items, and only obtain items now restored by the companion.

The companion can also determine whether to obtain the new complication data. For example, the companion can decide based on a state of the companion, e.g., battery level per connection state to a network. Thus, a management process of the companion (e.g., CSD 319) can determine whether the companion application gets to run or stops running When the new complication data is obtained, the companion application (e.g., by a complication controller) can create an update object that includes the new complication data. The update object can specify a particular template for displaying the new data. In other embodiments, the watch application can specify the particular template.

At block 410, the companion can determine whether to send the new complication data. Such a determination can be made by a WCD 316, which can track the complications that are in current use by the watch, and potentially be affected by other state information about the watch (e.g., a connectivity state and resources), as may be determined by CSD 319. Such a determination can be selectively made, e.g., the new complication data may have taken more than a threshold amount of time to obtain, and thus operations of the watch may have changed. Such a determination can also be made with respect to other communications involving the watch, e.g., a file may be in the process of being transferred.

At block 412, the new complication data is sent to the watch, e.g., when it has been determined that the new complication data can be sent. New refresh preferences can also be sent in a same time, e.g., in a same message. The new preferences can specify a preferred time for when the watch is to request the next update for the particular complication application.

At block 414, the watch can update the corresponding complication. In some embodiments, the new complication data can be sent in a specific format (e.g., from a complication controller in the watch) that identifies a particular template for displaying the data in a corresponding style window. A display manager can interpret the data corresponding to the particular template in an update of the complication. The particular template may be one of the plurality of predetermined templates for the style window selected for showing the complication. The display manager can use a particular template along with other settings of the watch face (e.g., color).

In this manner, the watch can control how often the complication data is updated. Otherwise, a companion application corresponding to a complication on an active watch face can cause unwanted processing on the watch. Such control of the complication data can reduce instances where the watch gets unnecessarily slowed down by new data from companion applications.

As an example, a complication can correspond to a sports application, which may provide scores for a particular game. In such an example, an app extension of the sports application can send user preferences to the watch, indicating a particular start time for when updated scores may be desired for showing in the complication. The watch may then not send any requests for new data until the start time, and thus the watch can save power.

The user preferences of the sports application can also indicate a preferred refresh rate once the game starts. An application may have a certain allotment of refreshes to a complication during a day, then thus the sports application can determine a particular refresh rate based on an expected length of time for the game for its given allotment of refreshes. The watch can then send requests based on the preferred refresh rate, and the sports application can retrieve the scores at that time or provide the scores if the scores had previously been retrieved.

2. Push

FIG. 4B shows a flowchart of a method 450 where a particular companion application provides an update to complication data to the watch according to embodiments of the present invention. Various blocks of method 450 can be optional. Method 450 can be performed in logic of the companion to manage transmission of new data to the watch, e.g., so as not to overburden the watch and drain the battery.

At block 452, the watch can send refresh preferences to the corresponding companion application. The refresh preferences can be sent at various times, e.g., once a day or multiple times during the day. The refresh preferences can include current state information of the watch, which may be used by the companion to determine an appropriate refresh rate for pushing new data to the watch. As examples, the refresh preferences can be determined by display manager 340 and/or WSD 329.

At block 454, a trigger can be received by the companion. In various embodiments, the trigger can be a periodic trigger generated by a system routine on the companion (e.g., a watch communications daemon) or by the companion application. As another example, the companion application can receive a push from the server when new data occurs (e.g., a new score happens). This new score can act as a trigger to send new complication data to the watch. Such uses for when a new score happens may be suitable for certain sports with low-scoring, such as soccer and hockey, and potentially football. Updating only when there is a score can save battery life, compared to periodic refreshes. Even with scoring updates, updates may be provided at certain times, e.g., at end of quarters or at halftime.

At block 456, new complication data can be obtained. The new data can be obtained in a variety of ways. The new data can be obtained (e.g., by companion application 312) from a server after the trigger has been received, e.g., when the trigger is a periodic, internal trigger. The new complication data can also be received as a push from a corresponding server (e.g., a server a user has subscribed to for push notifications), where a notification of the new data can act as a trigger.

At block 458, the companion determines whether the new data can be sent for the particular companion application. This determination can be made by various modules, e.g., by a watch communications daemon (WCD). The WCD can track which watch applications are running, e.g., by tracking which complications are being used on an active watch face. If an active watch complication corresponds to the companion application providing the new data, then the WCD can determine if it is suitable to send the new data. The WCD can manage the number of updates to ensure that the number of updates does not violate any policy limits for updating complications.

In some embodiments, WCD can wait until the watch initiates communication with the companion, and then send any new data. In this manner, the companion knows that the watch is awake and there is no concern about having to wake the watch up with a push. In other embodiments, a push can be allowed, e.g., for a companion application or messages flagged as special. When a message is flagged as special, the companion can know that the message can be pushed to the watch to wake up the corresponding watch application, e.g., when a corresponding complication is active on a watch face.

At block 460, the new data is sent to the watch, e.g., as in block 412.

At block 462, the complication is updated, e.g., as in block 414.

In one example, a companion application can be budgeted to send 30 or 40 (or other number) updates to the watch per day. If a companion application knows that there is a particular window of activity (e.g., for a sports game), the companion application can budget updates to allow for more updates during the window. A weather application, however, might spread updates evenly across the entire day.

D. Providing Watch Information to Companion

Watch information can also be sent to the companion. A user might specifically request data to be sent to the companion. As another example, background modes can be used to queue up content that will be delivered to the companion at some time. This may occur when the watch is generating content, and once the data is queued up, that content can be transferred over to the companion. For example, if the watch was tracking health data, the watch can have some sort of process for determining when it is appropriate to send over the data. Such a process can be managed by WSD 329.

E. Budgets

CSD 319 and WSD 329 can use budgets for determining what actions are to be performed by the companion and the watch. As examples, there can be three budgets involved for communications between the devices. There is how many messages can be sent in one day in total between a server and the companion, for a particular application, and for a particular type of message (e.g., push by a server or a request from the companion). Another class of budget is how many times the system chooses to launch an application in the background, e.g., to obtain new data or process the new data. Another class of budget is how many times messages can be sent between the companion and the watch in one day in total between the watch and the companion, for a particular application, and for a particular type of message (e.g., push by companion or a request from the watch).

As an example, for a weather application, it may only need to check at certain times, e.g., 9:00 a.m. because that is when the user wakes up. But, the weather application may want to update every hour, but that may be too much for the budget determined by a sampling daemon. In some embodiments, there can be a hybrid model where an application wants to update every half an hour, but the application also wants to be able to receive pushes. A budget can be tracked across both devices, e.g., a complication budget for actions on both devices.

If a budget is used up, certain updates at the end of the day may not be sent. For example, if an application wants an update every 10 minutes, then towards the end of that day, the budget may be used up. Further, the messages at the end of the day may not be allowed to be high priority because they consumed the budget doing the scheduled update.

CSD 319 can determine whether a message is to be sent based on the budget, e.g., whether a message is sent through WCD 316. The message can go through immediately when CSD approves, but otherwise the message can be queued, e.g., in queue 317. Or, the message can be dropped and the companion application can try later.

III. Templates

Complication data for a particular complication can be arranged according to a template to create a complication data object. For example, a complication controller (e.g., 325 of FIG. 3) on the watch can receive new data and determine which template to use. Each template can be designated for displaying the data in different ways. System routines (e.g., a display manager) on the watch can be configured to identify the selected template and display the complication in the appropriate manner. The complication data object can be sent to the display manager (e.g., 340 of FIG. 3) using a public API. The display manager can determine certain aspects for displaying the complication data, e.g., a color and style of the current watch face.

Each style window can have a plurality of templates (e.g., 5-15) that may be used with the style window. For example, a style window of a watch face could have eight different templates that could be used. Each template could have a different name for including in the corresponding complication data object, so as to identify the template being used. In some implementations, different templates can provide different amounts of data. For example, one template might provide three pieces of text data, and another template could provide just one piece of text data, or provide five pieces of text data. The different pieces of text data could be of different sizes within a template and vary from template to template. Other templates can include numbers, images, and combinations of any of the data types.

Figure 5B:
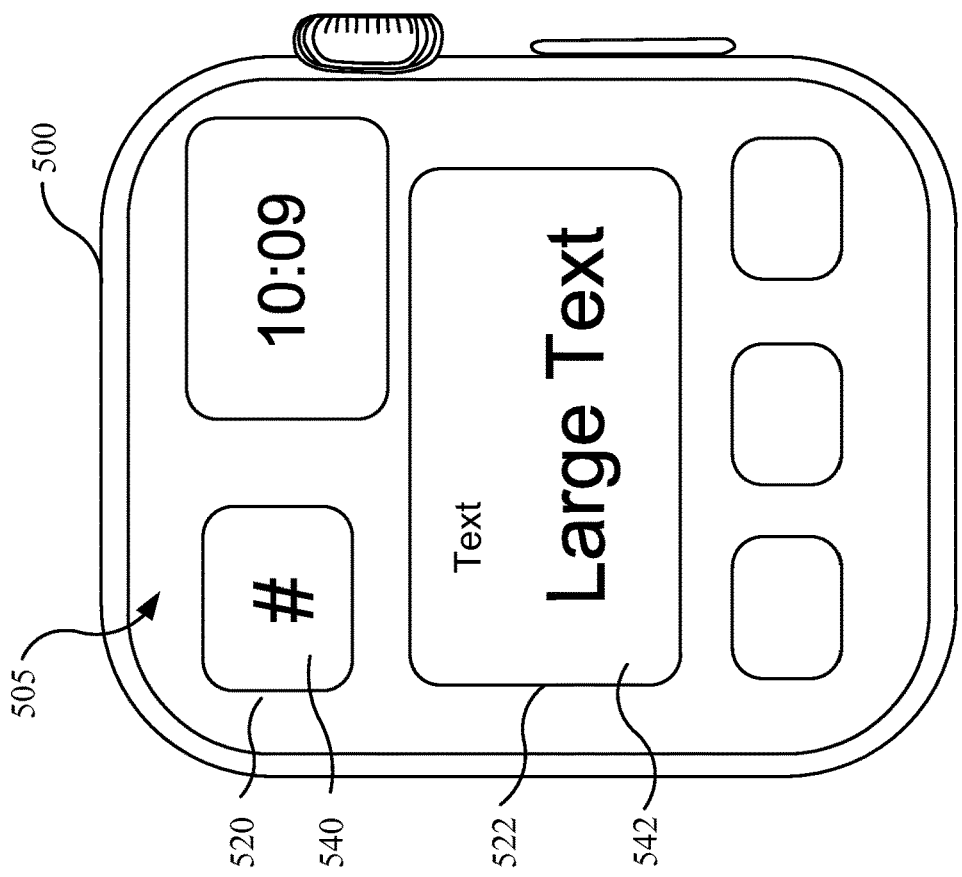
FIG. 5B shows the watch face with a second set of templates according to embodiments of the present invention.
Figure 5A:
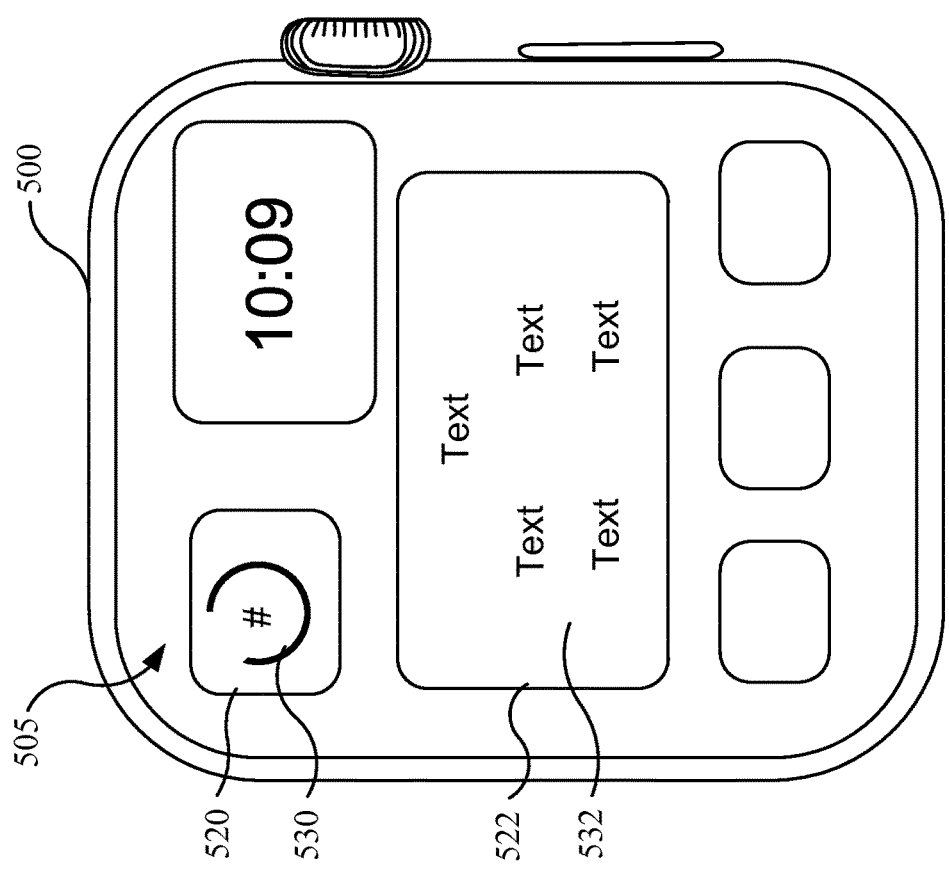
FIG. 5A shows a watch having a watch face with a first set of templates according to embodiments of the present invention.

FIG. 5A shows a watch 500 having a watch face 505 with a first set of templates according to embodiments of the present invention. Watch face 505 has style windows 520 and 522, as well as other style windows. Style window 520 has a first watch application selected for displaying the corresponding complication, and style window 522 has a second watch application selected for displaying the corresponding complication. In some embodiments, the larger style window 522 might have more available templates than style window 520, as there are more possibilities with the larger window.

Style window 520 shows a template 530 that combines a number (signified by the "#" sign) and an image according to the first watch application. The image corresponds to a circle with a filled portion that corresponds to the number. The number can be defined to be between 0-100 (e.g., as a percentage), with 100 providing a completely filled circle. Such a template might be used for an activity tracking application, e.g., for tracking a percentage of steps achieved toward a goal. The number is shown in a small size for the text.

Style window 522 shows a template 532 that uses five pieces of text data according to the second watch application. The five pieces of text are shown in a first size, e.g., a small size. Such text could be any text that the second application decides to display. The text can include letters, symbols, numbers, etc.

As an example for a sports application, the centered top text could indicate a sports league, and the other four pieces of data might can show scores of a particular game. As another example for an investing application, the centered top text could indicate a stock exchange, and the other four pieces of data can show prices for four stocks from the exchange.

FIG. 5B shows the watch face 505 with a second set of templates according to embodiments of the present invention. Style window 520 shows a different template 540 for the first watch application. In this other template option, the number is shown larger, and without the image of a partially filled circle.

Style window 522 shows a different template 542 for the second watch application. In this other template option, there are only two pieces of text. The top text is smaller and the lower text is in a larger font. Such a template might be suitable for a calendar application, with the top text providing the date, and the lower text providing information about an event for the given date and time.

In some embodiments, a watch application (e.g., via a complication controller) can determine which template to use. In other embodiments, options for the templates may be selected by a user. For example, after a user selects which application to use for a complication, the user can be provided with template options for how data from the application are to be displayed. Suitable options for the corresponding watch application can be displayed. Thus, the list of templates possible for a style window can be filtered by the corresponding watch application so that only templates suitable for the application are shown.

A. Definition

As mentioned above, a complication data object can be defined according to a specific template so that the complication data is displayed in a desired manner. Different templates can use different numbers of pieces of data. Thus, a particular template would have a fixed number of pieces of data. If a different number of pieces of data were used, then it would correspond to a different template. The various template specifications can be published, along with how the templates are displayed (e.g., as screen captures), so that a developer of a watch application can determine which templates are suitable for a particular application, and therefore which templates should be supported.

A template can be specified using a particular name. For example, the fourth template for a first style window can be specified as "1.4," which can be provided as a title or header in the complication data object. After the title/header, the pieces of data can be provided in a particular order. The order can impact how a piece of data is to be displayed. For example, the first piece of data for template 532 can correspond to the data to be displayed centered at the top. Or, for template 542, the second piece of data can be designated for displaying as the large text. Each piece of data in a template can be allotted a certain space (e.g., a certain length) for being displayed.

In some embodiments, a template can be defined as a particular class object. The class can be specified by the name of the template, and the particular class can have a specified number of pieces of data. The complication data object can thus represent a particular instance of the desired class object. A particular syntax can be used for specifying the template to use, and provide the corresponding data. In one example, a class object can include: title text on a first line, then data on line two can correspond to data to be displayed in column one, and then data on line three can correspond to data to be displayed in column two, and so on. In some implementations, a template could specify a font size (e.g., a relative font size between two pieces of text). In other implementations, the font size can be fixed for a specific piece of data for a given template.

As mentioned above, the style windows can include "small," "small modular," "large modular," "small utility," "large utility," and "circular," as examples. These names can be used as part of a template name. For example, a template could be "small.one" or "small.1" to specify the first template for the small style window. These names can be used in a complication data object in the name, so as to specify which template is to be used. A display manager for the watch can read the name, and thus determine which template is being provided.

B. Various Types of Templates

As mentioned above, various templates can include images, text, numbers, symbols, and the like, and combinations thereof. An image might be a static image, e.g., a particular logo of a company that is associated with the particular application. Such an image can be designated for displaying in a particular part of the window for the complication.

In other implementations, the image might be dependent on one of the pieces of data. For example, the image can correspond to a particular number. Template 530 is an example of this. The specific image may not be provided by the complication data object, as the image may be defined by the system. But, the complication data object can specify the exact form for the image by providing the number, which could be a floating point number from 0 and 1.

As another example, a template could display particular text of a template as incorporated into an image. For instance, a letter could be displayed inside of circle, as may be used to designate a particular bus line, or other public transportation. The letter could be in one color and the circle could be in another color. A template could specify an image to use, e.g., a circle or square for surrounding the text. A template could include an image over which the data (e.g., text or a number) is to be displayed. A mail application could provide an icon and a number signifying a number of messages, where the number is displayed in a specified manner over the icon.

IV. Using Templates on Watch

Once a watch face has been configured to have complications using selected applications, the selected applications can use templates to provide complication data for updating the complication on the watch face. An application can create a complication data object according to a desired template that the application wants used. A complication controller in a companion device or in a the watch can create such a complication data object that can be passed (e.g., via a public API call) to a display manager on the watch that is part of the system software of the watch.

Figure 6:
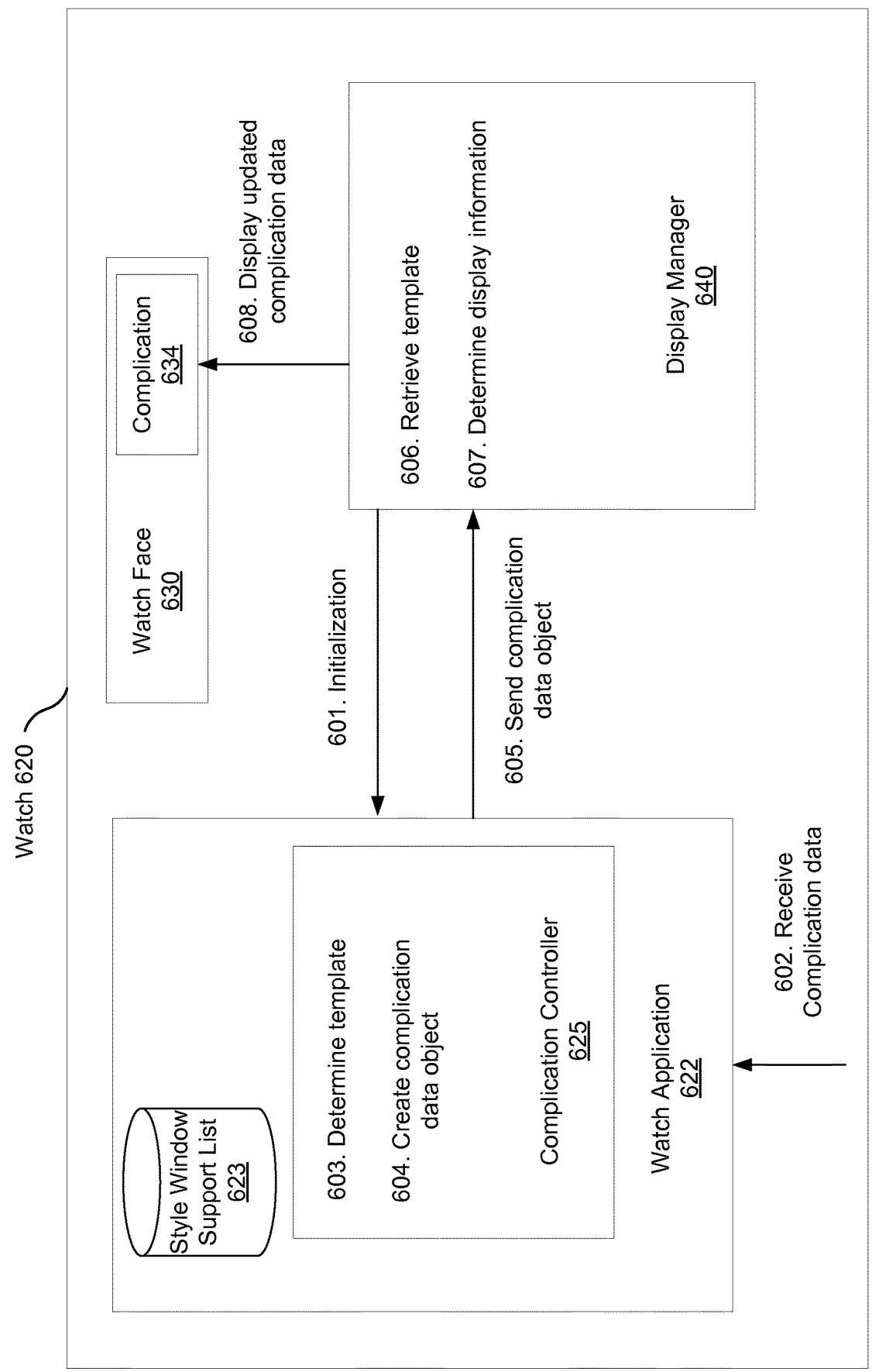
FIG. 6 shows a process for initializing and using templates to display data in a complication of a watch according to embodiments of the present invention.

FIG. 6 shows a process for initializing and using templates to display data in a complication of a watch 620 according to embodiments of the present invention. Watch 620 includes various components, which may correspond to components in FIG. 3. Watch 620 includes a watch application 622, which can include a complication controller 625 and a style window support list 623. In other embodiments, complication controller 625 can exist in a companion device that is in communication with the watch. Watch 620 further includes a display manager 640 and a watch face 630, within which complication 634 may be displayed.

At 601, an initialization can be performed. As part of the initialization, display manager 640 can inform watch application 622 which complication (e.g., which style window) that the application will be providing data for. Complication controller 625 can use the information about the corresponding style window in creating a complication data object for updating complication data in complication 634. In this manner, complication controller 625 can know that watch application 622 is to use templates for the large modular style (or other style window) when creating the complication data object.

At 602, complication data can be received by watch application 622. The complication data may have been sent by a companion device, and received via a watch transport daemon and a companion communications daemon, before being received by watch application 622. As various examples, the companion device may be a phone that is in communication with watch 620 or a server, e.g., when watch 620 has an Internet connection.

At 603, complication controller 625 can determine which template is to be used. In some embodiments, complication controller 625 can be configured to always select a particular template. For example, a developer can determine that if the style window is large.modular, then template large.modular.3 is always to be used. If another style window is being used, then a different template can be selected.

In other embodiments, complication controller 625 can determine which template to use based on the type of complication data that is being received. For example, if a sports application is providing updates to a particular game, then one template that displays two pieces of data might be used (e.g., with one piece of data in large text). While, if the sports application is providing a list of games to be played on a given day, then another template that displays six pieces of data might be used. As another example, if there is no game in a given day for the person's favorite team, the complication can display the time for the next game, which may use a different template. The configuration of which data is to be sent can be based on user preferences. Such preferences could be provided into a companion device, e.g., a favorite team, for which scores are to automatically be provided. Instead of a favorite team, a team could be selected based on the device's current location.

At 604, complication controller 625 can create the complication data object using the determined template. The complication data object can also include a name of the determined template and the complication data. In some embodiments, the complication data object can include units for how the complication data is to be displayed, e.g., whether any one of month, day, and/or year are to be use in a date. The complication data object also include a style that specifies how the data is to be displayed, e.g., whether the format of the date is numerical, e.g., "5/31/15" or "May 31, 2015." The style may also correspond to specific rules for how the data is to be reduced in length to fit into the limited space of a complication. Further, the complication data object can include a function call that specifies a system routine to determine the display, e.g., whether the data is to be displayed as a regular date, simple text, a time interval, or other suitable format.

At 605, complication controller 625 can provide the complication data object via a public API. The API call can be identified as corresponding to display manager 640, and thus routed accordingly. Display manager 640 can be configured to receive such API calls and respond by updating the corresponding complication. The corresponding complication can be identified via a table that correlates an application to the corresponding complication; such table can be created when a user configures the watch face.

In some embodiments, a complication data object could only include any data that has changed, and indicate which of the complication data the new data corresponds. In this manner, less data needs to be sent to display manager 640. In other embodiments, all of the data to be displayed in the complication can be sent each time. In such embodiments, display manager 640 can identify which data has changed, and limit processing on only the data that has changed. For example, only the new data may need to be formatted for displaying.

At 606, display manager 640 can retrieve the template identified in the complication data object. The template may be retrieved partially or entirely. For example, information about how to display data for the template can be retrieved, whereas other information about the template may not be needed.

At 607, display manager 640 can determine display information for the complication object. The display information can specify exactly how the complication data is to be displayed.

Thus, the display information can be provided to a rendering engine that determines which pixels are displayed with which colors and which intensities. In some embodiments, display manager 640 can determine whether the complication data fits into the allotted space for the complication. Display manager 640 may need to alter the data, e.g., by truncation, judicious abbreviation, or selective removal of certain text while maintaining more critical information to still convey the information in the complication.

At 608, the updated complication data is displayed in complication 634. The display may change just some of the data in complication 634 or all of the data. The display information for the updated complication data may be stored in a buffer and ready to be used the next time the display is turned on.

V. Specifying Text in a Complication Data Object

As described above, a watch application can provide a complication data object for system routines to display. A complication data object can include a template identifier (e.g., a name) corresponding to a particular number of data items. The complication data object can specify the data items after the template identifier, where a data item may be of a particular type, e.g., a date or a time, as well as others.

Each of the data items can further be a class, with defined components, such as text, units, and an identifier for a display function to use for displaying the text. The units can specify which parts of the data are to be displayed, e.g., whether a day of the week is to be displayed. The display function can use assigned rules to determine how to display the text in a maximum allotted length while losing as little conveyable information as possible. For example, the display function may operate with rules that are specific to the data time to determine an optimal text string that will fit in the allotted space.

The display function may be part of a display manager, which may be a system routine. A watch application can provide the data object to the display manager via a public API call, thereby allowing the watch application to efficiently specify a format for displaying the text. The watch application may only need to specify the text, units, and identify a display function for displaying the data item. Such a specification for the data item can be used across various style windows and various allotted lengths, thereby making development of the watch application easier. Although described with respect to complications, embodiments are applicable to displaying other types of data in a window of limited size.

A. Text Lengths

As described above, a watch can have a plurality of style windows, each of which can have a plurality of associated templates. When a complication controller sends a complication data object to display manager, the complication controller can know which style window the text is intended. But, the complication controller may not know the specific length of the text that is to be displayed. Thus, if the display manager were to display the text blindly, the text may get truncated at an inappropriate location that severely diminishes the information conveyed by the text.

For example, the text of a data item in a data object could be "Wednesday, December 23, 2015," which is 28 character spaces. The length of each character may vary depending on the specific text, but for ease of illustration, this example will use number of character spaces as a proxy for length. The allotted length for the data item may be less than 28 character spaces, and thus a simple display of the text might truncate the text to display "Wednesday, Decem," which is not informative as to the date or the year. Instead, it would be better to display "Wed, Dec 23, 2015," if the 17 spaces was smaller than a maximum length allotted for the data item. Or, if a shorter text string is needed, then "Wed, Dec 23" can be displayed.

The complication controller could determine the allotted length for each of the data items (e.g., from the display manager) and use a length function for determining the length of different options for displaying the text. But, even then, the complication controller may make errors, depending on the accuracy of the developer's code for the watch application. And, there is extra burden on the developer of the watch application to manage how the text is to be displayed.

Further, the amount of processing required of the watch application can be significantly more expensive due to the watch application's code not being optimized. Embodiments can address these and other problems. Further, a developer can obtain the benefit of not having to write their own code.

B. Block Diagram

Figure 7:
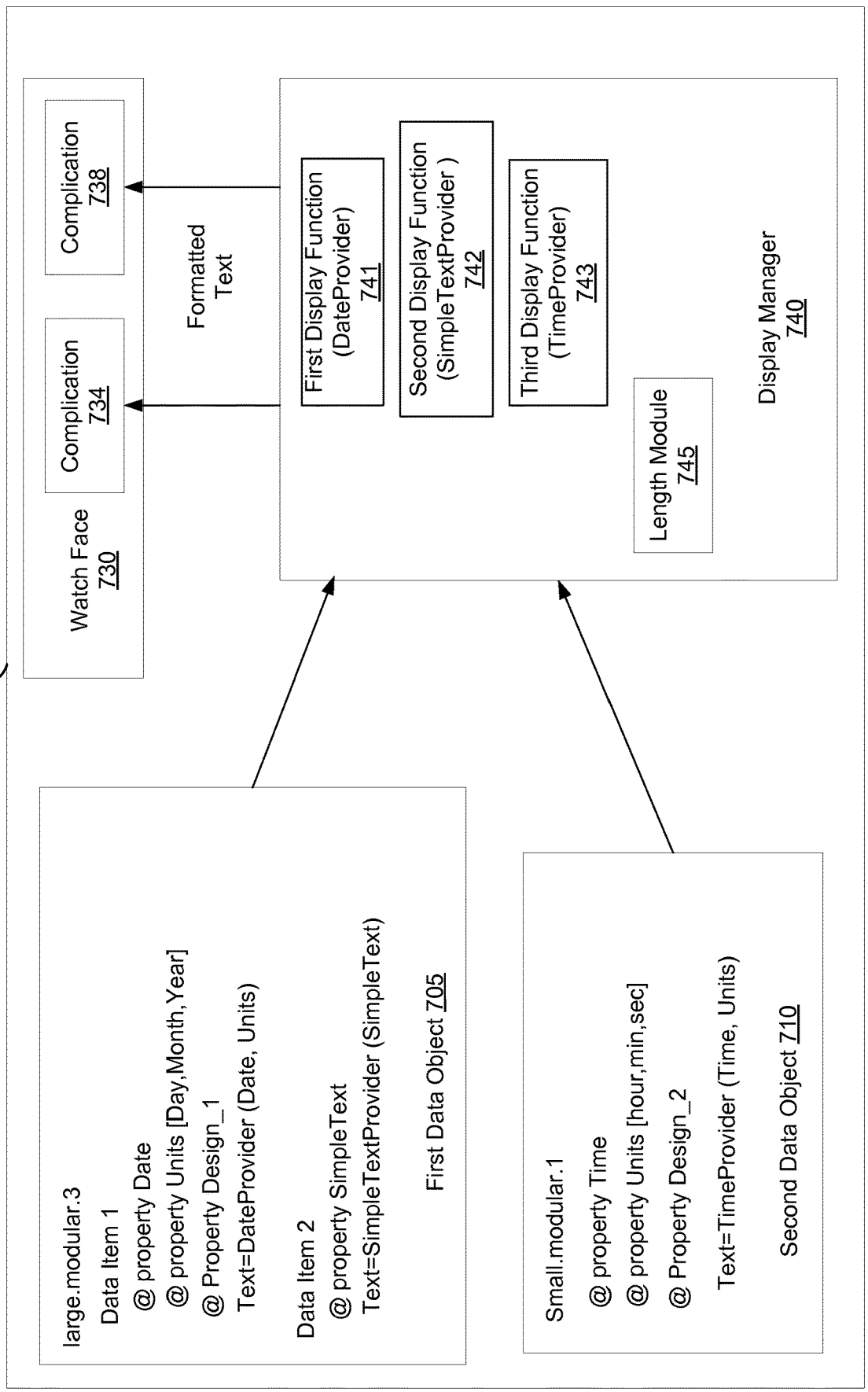
FIG. 7 illustrates a display manager of a watch displaying data objects received from a watch application using display functions according to embodiments of the present invention.

FIG. 7 illustrates a display manager 740 of a watch 720 displaying data objects received from a watch application using display functions according to embodiments of the present invention. Display manager 740 can determine which display function to use for each of a plurality of data items, which t may be displayed in various complications of a watch face. Each of the display functions may use different sets of rules for determining precisely how to display the text of data item(s) of a data object.

A first data object 705 is generated according to the template of type "large.modular.3," which corresponds to a third template of a "large modular" style window. First data object 705 is configured to be displayed in complication 734 of watch face 730. First data object 705 includes two data items: data item 1 and data item 2. Data item 1 and data item 2 can be shown on different lines of complication 734. In other embodiments, data item 1 and data item 2 can be displayed on a same line of complication 734, but in different allotted spaces.

Data item 1 includes various properties. As shown, data item 1 includes a date property that includes information for determining the date. Such date information can include a numerical value according to a date specification, and thus can be interpreted to correspond to a particular date. The date can be an absolute un-relativized time, e.g., a number of seconds that have elapsed since a reference date.

In data item 1, a units property can specify which portions of the date property are to be displayed. For example, the date property may include the day of the week, the numerical day of the month, the month, and the year. But, a complication controller may only want to display the numerical day of the month and the month, or potentially just the day of the month.

The units property allows the complication controller to specify which portions of the date are to be displayed. Thus, the complication controller does not need to parse the date property to determine the actual values, but instead can use the units property to specify the portions of the date to display. In some implementations, the order of the units does not matter, and instead the order of display can be defined by a design property (discussed below). In some embodiments, a default order for displaying a date (or other data item) can be defined by the user's location or a preferred language. For example, in French, the default order might be Wednesday, 23 Sep. And, in English, the order can be Wednesday, Sep 23.

In data item 1, a design_1 property can specify a design for displaying the date property. For example, the design can specify whether the date is to be displayed entirely in numerical form (e.g., 12/23/15) or whether another design is to be used, such as "Wednesday, December 23, 2015." Example designs are discussed in a later section.

Data item 1 also specifies a display function to be used for displaying the date. In this example, data item 1 specifies a function call "Text=DateProvider (Date, Units)." The function corresponds to the DateProvider function, which uses a first set of rules for reducing the length of the text, if necessary to fit within an allotted length of the assigned style window for complication 734. In some embodiments, the function call can act as a public API for the watch application to pass the date and units to display manager 740.

Data item 2 includes a simple text property, which can include any text string. Data item 2 further specifies a display function for displaying a simple text property. In this example, data item 2 specifies a function call "Text=SimpleTextProvider (SimpleText)." The function corresponds to the SimpleTextProvider function, which uses a second set of rules for reducing the length of the simple text, if necessary to fit within an allotted length of the assigned style window.

The allotted length for data item 1 may be for a first line of complication 734, and the allotted length for data item 2 may be for a second line of complication 734. Accordingly, a data object can mix and match different text provider functions, depending on what the watch application wants to display.

First data object 705 can be sent from the watch application (e.g., by a complication controller) to display manager 740, which can parse the data items in first data object 705. Display manager 740 can confirm that the number of data items equals an expected number of data items for the specified template. In this case, the large.modular.3 template can be specified as including two data items.

Once the two data items are identified and determined to match the specified template, each of the data items can be parsed for determining how to display. Data item 1 can be parsed to identify that a first display function 741 corresponds to the function call "Text=DateProvider (Date, Units)." First display function 741 can determine a first potential text string for displaying the date, given the units provided. A length module 745 can be used to determine a first length of the first potential text string. Length module 745 may be used in instances where each character of the text string does not use a fixed length to display. Thus, different combinations of 10 characters may have different lengths. Length module 745 can measure the length in a variety of ways, e.g., as a distance (e.g., millimeters) or as a number of pixels.

The first length can be compared to a maximum length allocated for data item 1. For a specified template of a particular style window, each data item for the template can be allotted different lengths. For example, data item 1 may be allotted a first maximum length, and data item 2 may be allotted a second maximum length. For data items that are images, an allotted size may form any two-dimensional shape. In some embodiments, a data item can be limited to one line, and thus the maximum allocated length would be limited to the one line. In other embodiments, a data item can be displayed on multiple lines, and thus the maximum allocated length can cover multiple lines.

If the first length exceeds the maximum allotted length, first display function 741 can determine a second potential text string according to a first set of rules defined for first display function 741. For example, first display function 741 can determine that a first potential text string "Wednesday, December 23" exceeds the maximum allotted length. The rules of first display function 741 may specify that a next potential text string be "Wednesday, Dec 23." If this string also exceeds the maximum allotted length, a third potential text string can be determined, e.g., Wed, Dec 23. Additional potential text strings can be determined until a text string is found that has a length that is equal to or shorter than the maximum allotted length. For example, the final text string can be just "23," which can be able to fit into any maximum allotted length for any style window.

Accordingly, the text string for data item 1 may be displayed differently depending on the maximum allotted length. But, the same code can be used by the watch application, regardless of which style window the text is to be displayed. Accordingly, a watch application can define a single data item for a date, and then insert that data item at the proper location within a data object according to the desired template.

As for data item 2, display manager 740 can determine that a second display function 742 should be used for displaying the simple text property, per the function call Text=SimpleTextProvider (SimpleText)." Second display function 742 can have a second set of rules defined, where the second set rules may differ from the first set of rules used for first display function 741. For example, second display function 742 can simply truncate the simple text to be equal to the maximum allotted length.

The maximum allotted length can depend on which template is used to create the data object. Each template can have a maximum allotted length for each data item of the template.

FIG. 7 also shows a second data object 710, which includes one data item. Second data object 710 is generated according to the template of type "small.modular.1," which corresponds to a first template of a "small modular" style window. Second data object 710 is configured to be displayed in complication 738.

Given that there is one data item, a label may or may not be used to specify a start of the data item. Second data object 710 includes a time property and a units property, which specifies which portions of the time are to be displayed. In this example, hours, minutes, and seconds are to be displayed. Or, at least those are the portions that are ideally to be displayed, if all of the units fit within the maximum allotted length for the second data object 710.

Second data object 710 specifies a display function to be used for displaying the time. In this example, the function call is "Text=TimeProvider (Time, Units)." The function corresponds to the TimeProvider function, which corresponds to a third set of rules for reducing the length of the text, if necessary to fit within an allotted length of the assigned style window (namely, small modular).

Display manager 740 can identify a third display function 743 to be used for displaying second data object 710, as indicated by the function call "Text=TimeProvider (Time, Units)." Third display function 743 can use a third set of rules to determine a text string for the time that will fit into the maximum allotted length for complication 738. Different potential text strings can be tried according to the third set of rules for third display function 743. Example rules are described in more detail below.

Design_2 property specifies a design for displaying the time property. For example, the design can specify whether the time is to be displayed entirely in 12 h-hour format or 24-hour format. Example designs are discussed in a later section. Design_2 may be a specific design for third display function 743. Thus, design_1 for one display function can differ from design_1 for another display function. Different rules may be used for different designs of a same display function.

The identification of the desired display function in a data object and the use of selected display functions in display manager 740 can provide flexibility to a developer of a client application (e.g., a watch application). For example, the client application can use similarly defined data items across different templates for different style windows, and the display function can format the data item for the specific allotted length of the corresponding style window. Thus, the complication controller may take advantage of the flexibility in reusing the same code for different templates, even for different style windows. A client application could make computation more efficient for a small style window by specifying fewer units, as then fewer potential strings may need to be checked.

C. Method

Figure 8:
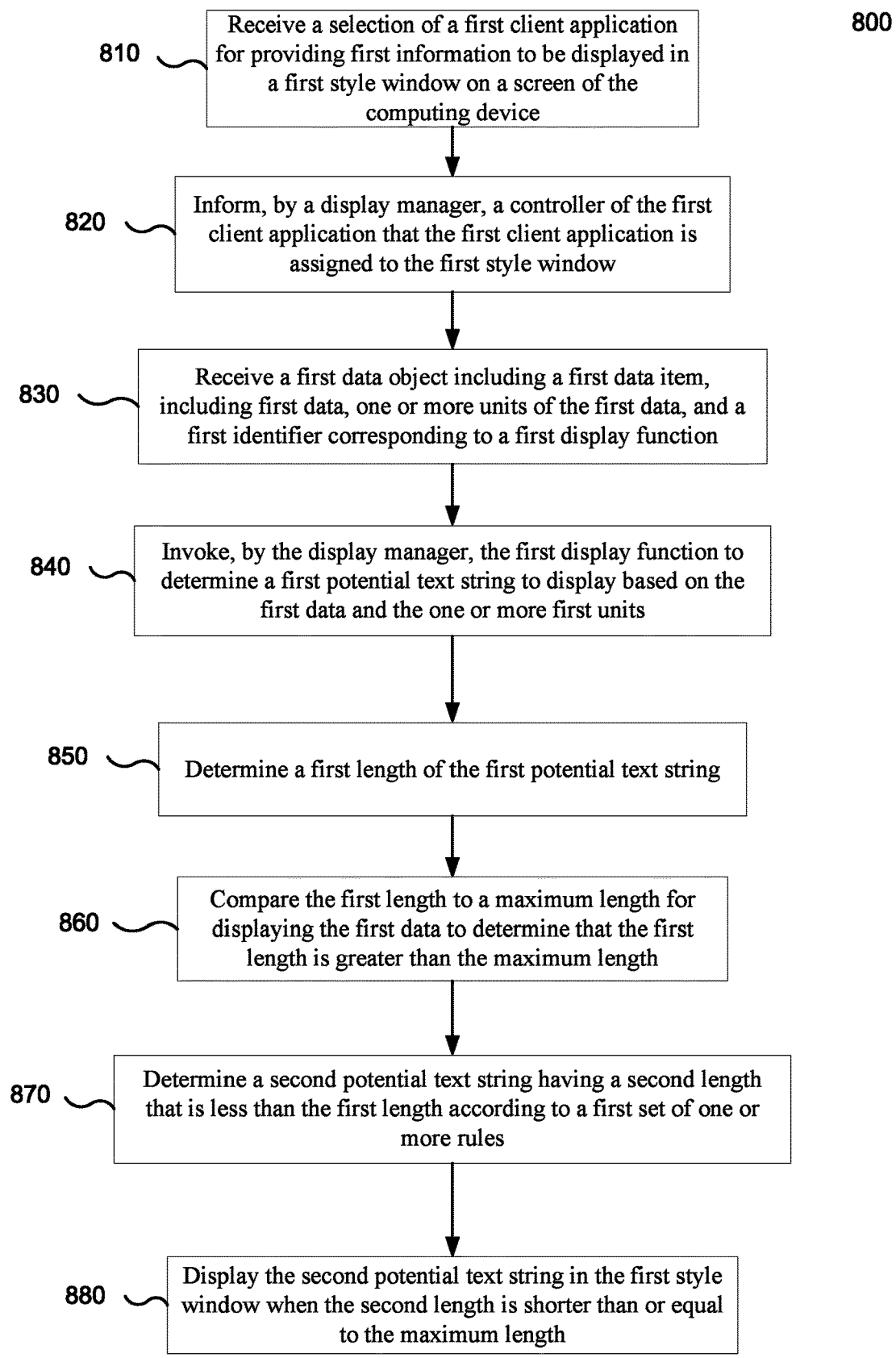
FIG. 8 is a flowchart illustrating a method for displaying text on a computing device according to embodiments of the present invention.

FIG. 8 is a flowchart illustrating a method 800 for displaying text on a screen of a computing device according to embodiments of the present invention. Method 800 can be performed wholly or partially by the computing device.

At block 810, a first client application is selected by a user for providing first information to be displayed in a first style window on a screen of the computing device. Such a selection may be performed as described for FIGS. 5A and 5B.

At block 820, a display manager can inform the first client application that the first client application is assigned to the first style window. In some embodiments, a controller (e.g., a complication controller) of the first client application can be informed. In this manner, the first client application can know which templates may be used.

At block 830, the display manager receives, from first client application, a first data object including a first data item for displaying in the first style window. The first data item can includes: first data, one or more first units, and first identifier. The one or more first units can specify one or more portions of the first data to be displayed in the first style window. The first identifier can identify a first display function to be used in displaying the first data. The first data object can be received from a controller (e.g., a complication controller) of the first client application. As examples, the first data may be text data or numerical data, e.g., a numerical number for date/time that can be parsed according to preset logic to obtain text for displaying the date/time.

At block 840, the display manager can invoke the first display function to determine a first potential text string to display based on the first data and the one or more first units. For example, the first display function can determine, according to a first set of rules, that the first potential text string for a date data item is "Wednesday, December 23, 2015."

At block 850, a first length of the first potential text string can be determined. For example, the first potential text string can be passed to a length function (e.g., length module 745) to determine its length.

At block 860, the first length is compared to a maximum length for displaying the text data to determine that the first length is greater than the maximum length. In some embodiments, the extent of how much longer the first length is than the maximum length can be used to determine which text string to try next. For example, if the different is sufficiently large, then the rules might specify that next test string be two levels lower, as opposed to just trying a next smaller version.

At block 870, the first display function can determine a second potential text string having a second length that is less than the first length according to a first set of one or more rules. The first set of rules can list an order of text strings to try, e.g., which text should be remove or abbreviated.

At block 880, the second potential text string can be displayed in the first style window when the second length is shorter than or equal to the maximum length. As the second length is shorter than or equal to the maximum length, it is known that the second potential text string can be viewed in its entirety by a user, and thus the amount of information list can be managed. In some embodiments, if all potential text strings have been exhausted for the first set of rules and none of them fit, then an error can be displayed. For example, a dash or dots can be displayed.

D. Types of Data Items and Display Functions

Embodiments can use various data items. For example, a data item can include a date, a time, a relative date, simple text, an image, and others. Units can be used for various properties, such as time, date, distance (units could be based on locale), location (e.g., latitude and longitude), temperature (e.g., precision in design Celsius), pressure, and the like. For an image, the client application can use its own formatting rules that determine how much space the image needs. For text, various display functions can be used.

Examples of a date provider are provided above. For a time provider, the property can be a date that includes time in addition to the calendar information. The units can be selected to display the time parts. The data item for time can specify whether AM and PM is used, or 24-hour time, e.g., by specifying a design. A design can also be selected based on a user's location. Other examples are provided below.

1. Simple Text Provider

As mentioned above, a simple text data item can include raw text, e.g., as opposed to data (like a date) that can be interpreted to determine a text string. An example raw text is to provide "67°." For such raw text, a simple text display function can truncate the text at the maximum allotted length, per one set of rules. Per another set of rules (e.g., as specified by a specific design), more than one piece of raw text can be specified for a data item. Each of the pieces of raw text can be shorter than a previous one, and the set of rules can try each of the pieces of raw text until one fits within the maximum allotted length, instead of truncating. The pieces of raw text can be provided as an array of different text strings. If the shortest text string is longer than the maximum allotted length, then the shortest text string can be truncated.

2. Time Interval Provider

Another data item corresponds to a time interval. The data item can include a start date and an end date. The data item can include an identifier for a display function with the function call "Text=TimeIntervalProvider (StartDate, EndDate, Units)." For example, with a start date (time) of 11:00 AM and an end date (time) of 12:30 PM. The text string can be displayed as "11:00 a.m.-12:30 p.m."

For an example with a start time of 3:30 p.m. and an end time of 4:30 p.m., the rules for the display function can display as "3:30-4:30 p.m." Thus, given the two dates, the rules of the display function can determine how to display the time interval. A further level of a shorter potential text string is to drop the minutes, e.g., "11 a.m. to 12 p.m." to make it fit. Or, just a start time can be provided, e.g., "11 a.m." If the start time and end time are longer than 24 hours apart, then the determined text string can be automatically displayed in terms of dates instead.

3. Relative Date Provider

Another data item corresponds to a relative date (also called can offset). The data item can include a date/time and calendar units, such as year, month, week, day, hour, minute, and second. The data item can include an identifier for a display function with the function call "Text=RelativeDateProvider (Date, Units)." The relative value can be computed against a current date or current time, e.g., depending on units.

For example, a date can be "June 1$^{st}$ at 12:00 p.m" and the calendar units can be provided as hour, minute, and second. Then, if a user was to look at the watch at 10:30, the display can be "1hr30mins." Then, at 11:58, the display can be "2mins4secs." Any number of units can be specified, e.g., years, months, weeks, days, hours, minutes, and seconds. Rules for one design can provide the top two units that are nonzero. A client application can specify which units should be checked, and potentially leave out some. For example, if weeks was left out, then the display can include months and days.

Thus, the specific date is not provided, but a time difference from now and the specific date. Accordingly, a client application can provide just one data item in one data object, and have the system (e.g., a display manager) update the time differences that are displayed. This reduces the effort needed by the client application.

Abbreviations can also be used to fit this offset time into the allotted length. For example, minutes and become "mins." And, "mins" can become "min," if a shorter text string is needed, as part of the set of rules for the relative date display function. As the offset time is counting down, knowledge of which hierarchal level fit into the allotted length can be reused so that a length function does not need to be called again. For example, a change from "2hrs10mins" to "2hrs9mins" does not require a new check to confirm that the new text string fits, if it is known that the old text string fit.

The design of "2hrs10mins" can be considered a natural language design, but other designs can be used. For example, a timer style can be used, such as "2:10." Another design can use a "+" to show that there is a certain time to go before the specified date is reached. For example, the design can be "+23 hours." The rules for this design can be to show only the highest nonzero unit. Such a design can be used in window used to show an offset when a watch is in a time travel mode, where historical/future data can be shown relative to a current time. Further details on a time travel mode are described in concurrently filed U.S. Patent Application entitled "Obtaining And Displaying Time-Related Data On An Electronic Watch." In such a time travel mode, a "−" sign can indicate a time in the past, and a "+" sign can indicate a time in the future.

4. Combination Text Provider

Another data item can correspond to combining text from other types, which can be called a format text provider. The data item can include a format string property. The format string can be provided with a substitute symbol, e.g., "%@." The format text data item can include a data sub-item that can then be used to determine the text substring that is to be displayed where the substitute symbol is located.

For example, the format string can be "Lunch in %@." Thus, the format string can include actual text and one or more substitute symbols, or potentially all substitute symbols. For example, a format string could be "%@%@." In such an instance, an array of data sub-items can be provide in the format string data item, where the first data sub-item is used for the first instance of the substitute symbol "%@." The format data item is an example of a parent data item that includes a plurality of data sub-items.

Back to the example of "Lunch in %@," suppose the data sub-item was a relative date data item, with a date of 12:00. If the current time was 11:57, then a relative date display function can determine "3 min" should replace the substitute symbol "%@" for a potential text string. A length function can be called to determine whether the full text string "Lunch in 3 mins" fits within the allotted length. If this text string did not fit, a shorter text string can be generated as "Lunch in 3 min" or "Lunch in 3 m."

The data sub-item can be specified by a function call with certain properties of the data sub-item provided as arguments, e.g., RelativeDateProvider (Date, Units), in the example above. When more than one substitute symbol is used, an array of text provider functions can be used, each corresponding to a different data sub-item, potentially of different types. These function calls can be used to invoke different display functions in a display manager. Each of the display functions can contribute a text substring according to its rules for a given iteration of testing the overall text string to fit within an allotted length for the full form text data item. Thus, the array of data sub-items can be used to provide different types of data items on a single line, e.g., a date and a time, can be provided on a single line of a style window.

In some embodiments, the array of data sub-items can be used to provide fall back positions. For example, if the format string included just one substitute symbol, but an array of data sub-items can be provided. The array of data sub-items may be of the simple text type. The format text display function can identify the situation of one substitute symbol with an array of multiple data sub-items, and determine that the first data sub-item is to be tested first, and a second data sub-item is to be test second, and so on. Such a mechanism can allow a client application to specify fallback text strings of a type simple text.

E. Reuse of Previous Results

In some embodiments, display manager 740 can use results from displaying a previous data object with a first display function to determine which text string in a hierarchy (e.g., according to the rules for the first display function) should be tried first to see if it complies with the maximum allotted length. For example, assume a third potential text string had the maximum allotted length for a date data item of an earlier data object, and at a later, assume a next data object for a same template also includes the date data item. The first display function can try the third potential text string without having to try the longer first and second potential text strings.

Accordingly, as display manager 740 goes through the options of test strings for a data item, display manager 740 can cache the text strings that were generated for the options and the sizes. This reuse of the cached data can avoid having to call length module 745 as many times, as determining a length of a text string can be an expensive operation. Thus, if the date has the same values for the units that were ultimately displayed (e.g., the same number of days for the relative date provider), the previously identified text string can be used. Further, just knowing that the third option was selected for a particular data item can be used to know that the third option is likely going to be the one that fits in the allotted space. Even if the third option was smaller than the maximum allotted length, only the second option might need to be tried, which can save at least one function call to length module 745.

As an example, a time data item can correspond to time T, and a next time data item can be received for time T plus one. If the text string actually displayed had units that did not change from T to T plus one, then the same text string can be used. As another example, a time travel mode can be used to view historical/future data. If the historical/future included predictable information, such as date and/or time, then a text string displayed previously can be used exactly or a hierarchy level of the text string can be used to determine the new text string. As yet another example, two complications may both provide a date and use a same template. In such a case, the same text string can be used.

VI. Rules for Watch Face Formatting

Each display function can have a different set of rules, which can vary based on the data types being displayed and the display function being used.

FIGS. 9A-9H shows various designs for reducing a length of text in a data item according to embodiments of the present invention. The rules for a particular design of a display function can define a certain hierarchy for determining potential text strings that will fit into an allotted length, e.g., be less than or equal to a maximum allotted length. The designs can depend on which units are specified for a data item.

A. Points in Time

For points in time, two example data items correspond to date and time. Various designs for date data items are described first, and then various designs for time data items are described second.

1. Date

FIG. 9A shows a hierarchy for a first design for data items of a date type for the date display function. The hierarchy represents rules for determining potential text strings. The hierarchy can be traversed until a text string is found that will fit into the allotted length, e.g., be less than or equal to a maximum allotted length. The label 1A signifies the first potential text string for design 1, and so on.

The first potential text string is designed to be "Wednesday, December 23." The second potential text string is designed to be "Wednesday, Dec 23," where an abbreviation of "Dec" is used. The third potential text string is designed to be "Wed, Dec 23," where another abbreviation of "Wed" is used. The fourth potential text string is designed to be "Wed 23," where the month is dropped. Such an option may be used for smaller style windows. The fifth potential text string is designed to be "23," where the day of the week is dropped. Such an option may be used for a smallest style window.

FIG. 9B shows a hierarchy for a second design for data items of a date type for the date display function. The first potential text string is designed to be "January 23, 2015." The second potential text string is designed to be "January 23," where the year is dropped. The third potential text string is designed to be "Jan 23," where an abbreviation of "Jan" is used. The fourth potential text string is designed to be "23," where the day of the week is dropped. Such an option may be used for a smallest style window.

In some embodiments, for FIGS, 9A and 9B, adding letters after the day number is optional. For example: $1^{st}$, $2^{nd}$, $3^{rd}$, $4^{th}$, etc.

FIG. 9C shows a hierarchy for a third design for data items of a date type for the date display function. The first potential text string is designed to be "01/01/2015." The second potential text string is designed to be "01/01/15," where the year is shortened. The third potential text string is designed to be "1/1/15," where it is identified that only one digit is needed for the month and year.

2. Time

FIG. 9D shows a hierarchy for a first design for data items of a time type for the time display function. The first potential text string is designed to be "10:09:59 AM." The second potential text string is designed to be "10:09 AM," where the seconds are dropped. The third potential text string is designed to be "10:09," where "AM" is dropped. Various designators can be used, such as "AM" and "PM," or "am" and "pm," and spaces may or may not exist between the numbers and the designator. Another design can use 24-hour time, e.g., "23:59:59", which can be reduced to "23:59."

B. Time Interval (Durations)

FIG. 9E shows a hierarchy for a first design for data items of a time interval type for the item interval display function. This first design can be used for durations of less than 24 hours. The first potential text string is designed to be "9:00am-10:00pm." The second potential text string is designed to be "9am-10pm," where the minutes are dropped. The dropping of minutes may or may not be dependent on whether the minutes are nonzero. The third potential text string is designed to be "9:00am," where the end date is dropped, but the minutes have been brought back. The fourth potential text string is designed to be "9am" where the minutes are dropped. The am/pm designator may be used on on end time if start and end time designators are the same.

For durations of 24 hours or more, a second design is to use "JAN 1-JAN 7," which may be the only option for this design. Adding letters after the day number is optional. For example: $1^{st}$, $2^{nd}$, $3^{rd}$, $4^{th}$, etc.

FIG. 9F shows a hierarchy for a third design for data items of a time interval type for the item interval display function. This third design can be used for durations of more than 24 hours. The first potential text string is designed to be "01/01/15-01/07/15." The second potential text string is designed to be "01/01-01/07," where the year has been dropped. The third potential text string is designed to be "1/1-1/7," where it has been determined that a single digit can be used for displaying the month and day.

C. Relative Date (Offsets)

FIG. 9G shows a hierarchy for a first design for data items of a relative date type for the relative date display function. The first potential text string is designed to be "2hrs 23mins." In some implementations, a support of singular vs plural can be performed automatically, where the singular would be used when a value is one. The second potential text string is designed to be "2hr 23min," where the plural is dropped. The third potential text string is designed to be "2h 23m," where a new abbreviation of "h" is used for hours, and a new abbreviation of "m" is used for minutes.

Other examples for the first design using plural abbreviations include: "9yrs 11mos," "11mos 3wks," "3wks 6days," "6days 23hrs," "23hrs 59mins," "59mins 59secs," and "0mins 59secs." These examples show changes to small units as time elapses closer to the specified date. Further example for the first design using singular abbreviations include: "9yr 11mo," "11mo 3wk," "3wk 6day," "6day 23hr," "23hr 59min," "59min 59sec," and "0min 59sec." Yet other examples using shorter abbreviations include: "9y 11m," "11mo 3w," "3w 6d," "6d 8h," "23h 59m," "59m 59s," and "0m 59s." In some implementations, seconds may not be used, e.g., "0hrs 1 min" may be used. For a value of zero, a value of "Now" can be displayed.

FIG. 9H shows a hierarchy for a second design for data items of a relative date type for the relative date display function. The first potential text string is designed to be "+59 MINUTES." The second potential text string is designed to be "+59 MINS," where the abbreviation "MINS" is used. Such an option can be used in a time travel mode.

Other examples for the second design include: "NOW," "+59 MINUTES," "+23 HOURS," "+6 DAYS," "+4 WEEKS," "+11 MONTHS," and "+XX YEARS." The "+" can indicate a future time in one mode, or can indicate an amount of time until a specified future date/time. A "−" sign can include a past time in one mode, or can indicate an amount of time after a specified future date/time.

A third design can specify the time as "2:23," as may occur for a timer design. Other examples for the third design include: "0:01," "9:59," "10:00," "23:59," "1 DAY," "6 DAYS," "1 WEEK," "4 WEEKS," "1 MONTH," "11 MONTHS," "1 YEAR," and "2 YEARS." In some embodiments, a switch to +1 DAY may occur when the date has changed, as opposed to after 24 hours.

For abbreviations, in upper or lower case can be as follows: "MINUTE" to "MIN" and "MINUTES" to "MINS," "HOUR" to "HR" and "HOURS" to "HRS," "WEEK" to "WK" and "WEEKS" to "WKS," "MONTH" to "MO" and "MONTHS" to "MOS," and "YEAR" to "YR" and "YEARS" to "YRS." Abbreviation usage can be consistent across timescales. For example, all can show up with the full name, or all should show up in abbreviated form. Any units can be omitted in the data item, and thus would not show up in the displayed text. For example, it may be desired not to show weeks, and thus a display can include months and days, where the days can be greater than 6. Accordingly, any middle states can be omitted. A maximum offset time for displaying can be specified. The date for which the offset is measured can be specified in a variety of ways, such as by specifying a date or relative to a current time.

D. Decimal Rounding

Some embodiments can show as many decimals as desired when space is available, subject to limitations of character count. Decimals can be dropped before truncating any other text. In one design, the decimal rounding can drop the least significant values first. The values can be percentages as well.

An example of counting up from seconds with hundredths of a second after the decimal can be as follows: "00.00"; "59.99" for 59 seconds and 99 hundredths of a second; "1:00.00" for one minute; "9:59.99" for 9 minutes, 49 seconds, and 99 hundredths of a second; "10:00.1" for 10 minutes and one tenth of a second; "59:59.9" for 59 minutes, 59 seconds, and 9 tenths of a second, "1:00:00" for one hour; "9:59:59" for nine hours, 59 minutes, and 59 seconds; and "10:00:00" for ten hours.

VII. Example Devices

Figure 10:
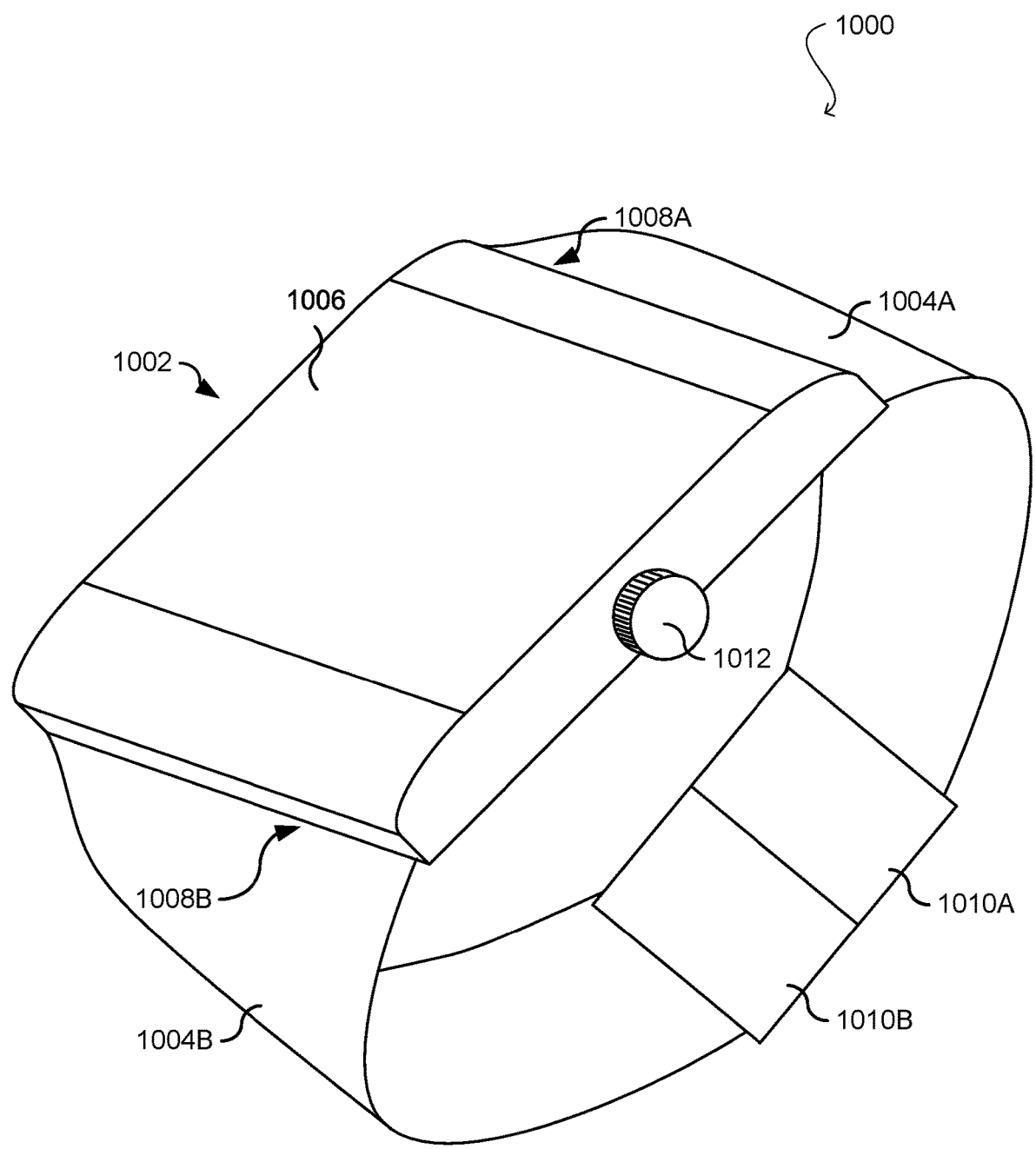
FIG. 10 shows a wearable watch device according to embodiments of the present invention.

Embodiments described herein may take the form of, be incorporated in, or operate with a suitable electronic device, e.g., companion devices or a watch device. One example of such a device is shown in FIG. 10 and takes the form of a wearable watch device. Alternative embodiments of suitable electronic devices include a mobile phone, a tablet computing device, a portable media player, and so on. Still other suitable electronic devices may include laptop/notebook computers, personal digital assistants, touch screens, input-sensitive pads or surfaces, and so on.

FIG. 10 shows wearable watch device 1000 according to some embodiments of the present invention. In this example, wearable device 1000 is shown as a wristwatch-like device with a face portion 1002 connected to straps 1004A, 1004B. In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Face portion 1002 can include, e.g., a touchscreen display 1006 that can be appropriately sized depending on where on a user's person wearable device 1000 is intended to be worn.

A user can view information presented by wearable device 1000 on touchscreen display 1006 and provide input to wearable device 1000 by touching touchscreen display 1006. In some embodiments, touchscreen display 1006 can occupy most or all of the front surface of face portion 1002.

Straps 1004A, 1004B can be provided to allow wearable device 1000 to be removably worn by a user, e.g., around the user's wrist, and secured thereto. In some embodiments, straps 1004A, 1004B can be made of any flexible material (e.g., fabrics, flexible plastics, leather, chains or flexibly interleaved plates or links made of metal or other rigid materials) and can be connected to face portion 1002, e.g., by hinges. Alternatively, straps 1004A, 1004B can be made of a rigid material, with one or more hinges positioned at the junction of face 1002 and proximal ends 1008A, 1008B of straps 1004A, 1004B and/or elsewhere along the lengths of straps 1004A, 1004B to allow a user to put on and take off wearable device 1000. Different portions of straps 1004A, 1004B can be made of different materials; for instance, flexible or expandable sections can alternate with rigid sections. In some embodiments, one or both of straps 1004A, 1004B can include removable sections, allowing wearable device 1000 to be resized to accommodate a particular user's wrist size. In some embodiments, straps 1004A, 1004B can be portions of a continuous strap member that runs behind or through face portion 1002. Face portion 1002 can be detachable from straps 1004A, 1004B; permanently attached to straps 1004A, 1004B; or integrally formed with straps 1004A, 1004B.

The distal ends of straps 1004A, 1004B opposite face portion 1002 can provide complementary clasp members 1010A, 1010B that can be engaged with each other to secure the distal ends of straps 1004A, 1004B to each other, forming a closed loop. In this manner, device 1000 can be secured to a user's person, e.g., around the user's wrist; clasp members 1010A, 1010B can be subsequently disengaged to facilitate removal of device 1000 from the user's person. The design of clasp members 1010A, 1010B can be varied; in various embodiments, clasp members 1010A, 1010B can include buckles, magnetic clasps, mechanical clasps, snap closures, etc. In some embodiments, one or both of clasp members 1010A, 1010B can be movable along at least a portion of the length of corresponding strap 1004A, 1004B, allowing wearable device 1000 to be resized to accommodate a particular user's wrist size.

Straps 1004A, 1004B can be two distinct segments, or they can be formed as a continuous band of an elastic material (including, e.g., elastic fabrics, expandable metal links, or a combination of elastic and inelastic sections), allowing wearable device 1000 to be put on and taken off by stretching a band formed by straps 1004A, 1004B. In such embodiments, clasp members 1010A, 1010B can be omitted.

Straps 1004A, 1004B and/or clasp members 1010A, 1010B can include sensors that allow wearable device 1000 to determine whether it is being worn at any given time. Wearable device 1000 can operate differently depending on whether it is currently being worn or not. For example, wearable device 1000 can inactivate various user interface and/or RF interface components when it is not being worn. In addition, in some embodiments, wearable device 1000 can notify a companion device (e.g., a smartphone, a mobile device, a tablet device, a media player, a speaker, or other electronic devices) when a user puts on or takes off wearable device 1000.

In various embodiments, wearable device 1000 includes a rotary input such as a crown 1012 (also referred to as digital crown throughout the specification). Crown 1012 can be used to perform a variety of functions. In some embodiments, crown 1012 provides rotation input for navigating content (e.g., zooming in and out of content, panning across content). In this example, crown 1012 includes a plastic or metal crown body, preferably having conventional outer teeth. Typically, a pedestal made integral with the body of crown 1015 is positioned and protrudes into face portion 1002. Crown 1012 may be fastened, either permanently or removably, to hardware associated with wearable device 1000. Rotation of the crown (and/or a stem) may be sensed optically, electrically, magnetically, or mechanically. Further, in some embodiments the crown (and/or stem) may also move laterally, thereby providing a second type of input to the device.

Wearable device 1000 may likewise include one or more buttons (not shown here). The button(s) may be depressed to provide yet another input to the device. In various embodiments, the button may be a dome switch, rocker switch, electrical contact, magnetic switch, and so on. In some embodiments the button may be waterproof or otherwise sealed against the environment.

It will be appreciated that wearable device 1000 is illustrative and that variations and modifications are possible. For example, wearable device 1000 can be implemented in any wearable article, including a watch, a bracelet, a necklace, a ring, a belt, a jacket, or the like. In some instances, wearable device 1000 can be a clip-on device or pin-on device that has a clip or pin portion that attaches to the user's clothing. The interface portion (including, e.g., touchscreen display 1006) can be attached to the clip or pin portion by a retractable cord, and a user can easily pull touchscreen display 1006 into view for use without removing the clip or pin portion, then let go to return wearable device 1000 to its resting location. Thus, a user can wear wearable device 1000 in any convenient location.

Wearable device 1000 can be implemented using electronic components disposed within face portion 1002, straps 1004A, 1004B, and/or clasp members 1010A, 1010B.

Figure 11:
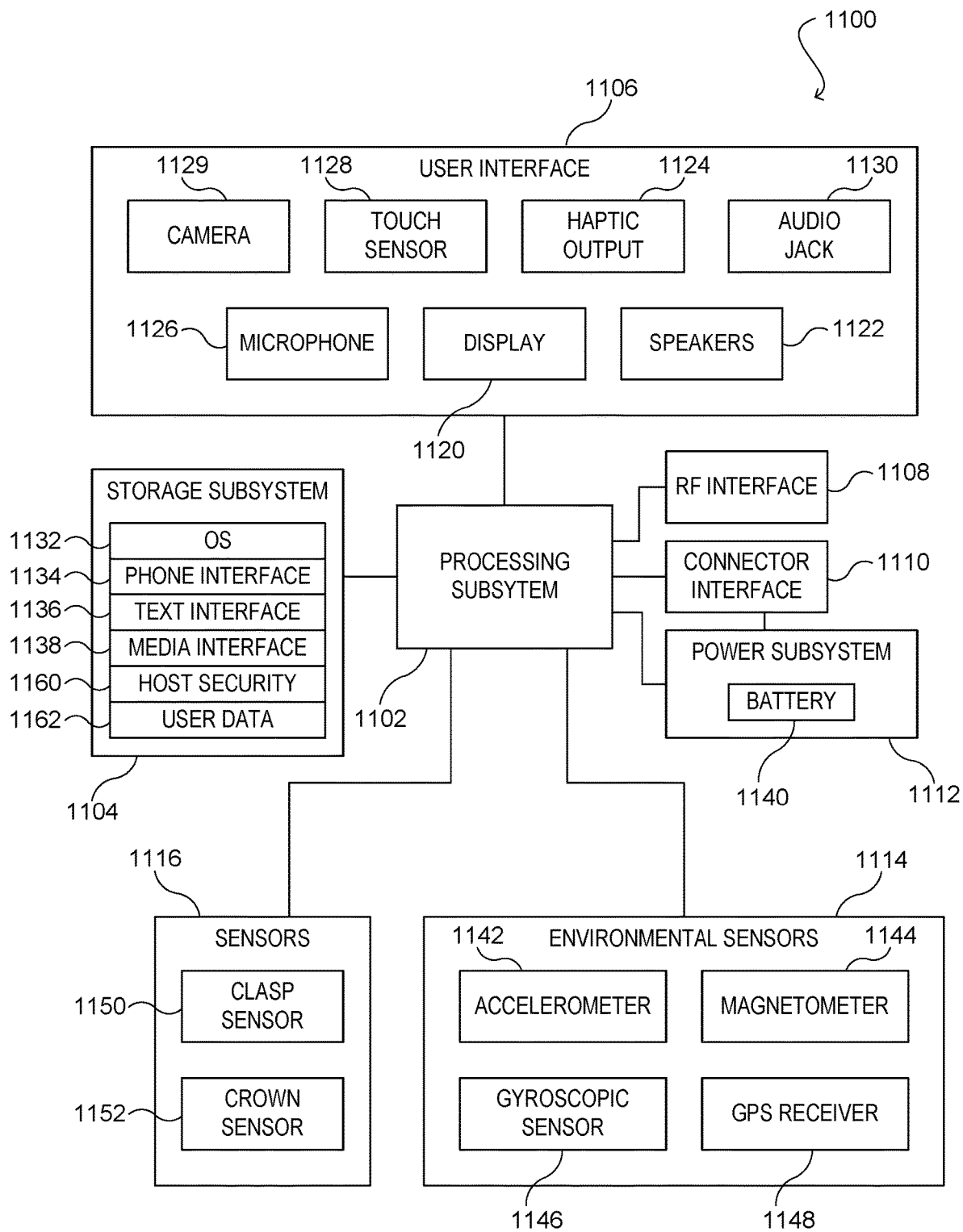
FIG. 11 is a simplified block diagram of an example companion or watch device according to embodiments of the present invention.

FIG. 11 is a simplified block diagram of a device 1100 (e.g., wearable device 1000 or a companion device) according to an embodiment of the present invention. Wearable device 1100 can include processing subsystem 1102, storage subsystem 1104, user interface 1106, RF interface 1108, connector interface 1110, power subsystem 1112, environmental sensors 1114, and strap sensors 1116. Wearable device 1100 can also include other components (not explicitly shown).

In many embodiments, the electronic device may keep and display time, essentially functioning as a wristwatch among other things. Time may be displayed in an analog or digital format, depending on the device, its settings, and (in some cases) a user's preferences. Typically, time is displayed on a digital display stack forming part of the exterior of the device.

Storage subsystem 1104 can be implemented, e.g., using magnetic storage media, flash memory, other semiconductor memory (e.g., DRAM, SRAM), or any other non-transitory storage medium, or a combination of media, and can include volatile and/or non-volatile media. In some embodiments, storage subsystem 1104 can store media items such as audio files, video files, image or artwork files; information about a user's contacts (names, addresses, phone numbers, etc.); information about a user's scheduled appointments and events; notes; and/or other types of information, examples of which are described below. In some embodiments, storage subsystem 1104 can also store one or more application programs to be executed by processing subsystem 1102 (e.g., video game programs, personal information management programs, media playback programs, interface programs associated with particular host devices and/or host device functionalities, etc.).

User interface 1106 can include any combination of input and output devices. A user can operate input devices of user interface 1106 to invoke the functionality of wearable device 1100 and can view, hear, and/or otherwise experience output from wearable device 1100 via output devices of user interface 1106.

Examples of output devices include display 1120, speakers 1122, and haptic output generator 1124. Display 1120 can be implemented using compact display technologies, e.g., LCD (liquid crystal display), LED (light-emitting diode), OLED (organic light-emitting diode), or the like. In some embodiments, display 1120 can incorporate a flexible display element or curved-glass display element, allowing wearable device 1100 to conform to a desired shape. One or more speakers 1122 can be provided using small-form-factor speaker technologies, including any technology capable of converting electronic signals into audible sound waves. In some embodiments, speakers 1122 can be used to produce tones (e.g., beeping or ringing) and can but need not be capable of reproducing sounds such as speech or music with any particular degree of fidelity. Haptic output generator 1124 can be, e.g., a device that converts electronic signals into vibrations; in some embodiments, the vibrations can be strong enough to be felt by a user wearing wearable device 1100 but not so strong as to produce distinct sounds.

Wearable device 1100 may also provide alerts to a user. An alert may be generated in response to: a change in status of the device (one example of which is power running low); receipt of information by the device (such as receiving a message); communications between the device and another mechanism/device (such as a second type of device informing the device that a message is waiting or communication is in progress); an operational state of an application (such as, as part of a game, or when a calendar appointment is imminent) or the operating system (such as when the device powers on or shuts down); and so on. The number and types of triggers for an alert are various and far-ranging.

The alert may be auditory, visual, haptic, or a combination thereof. A haptic actuator may be housed within the device and may move linearly to generate haptic output (although in alternative embodiments the haptic actuator may be rotary or any other type). A speaker may provide auditory components of an alert and the aforementioned display may provide visual alert components. In some embodiments a dedicated light, display, or other visual output component may be used as part of an alert.

The auditory, haptic and/or visual components of the alert may be synchronized to provide an overall experience to a user. One or more components may be delayed relative to other components to create a desired synchronization between them. The components may be synchronized so that they are perceived substantially simultaneously; as one example, a haptic output may be initiated slightly before an auditory output since the haptic output may take longer to be perceived than the audio. As another example, a haptic output (or portion thereof) may be initiated substantially before the auditory output but at a weak or even subliminal level, thereby priming the wearer to receive the auditory output.

Examples of input devices include microphone 1126, touch sensor 1128, and camera 1129. Microphone 1126 can include any device that converts sound waves into electronic signals. In some embodiments, microphone 1126 can be sufficiently sensitive to provide a representation of specific words spoken by a user; in other embodiments, microphone 1126 can be usable to provide indications of general ambient sound levels without necessarily providing a high-quality electronic representation of specific sounds.

Touch sensor 1128 can include, e.g., a capacitive sensor array with the ability to localize contacts to a particular point or region on the surface of the sensor and in some instances, the ability to distinguish multiple simultaneous contacts. In some embodiments, touch sensor 1128 can be overlaid over display 1120 to provide a touchscreen interface, and processing subsystem 1102 can translate touch events (including taps and/or other gestures made with one or more contacts) into specific user inputs depending on what is currently displayed on display 1120. In some embodiments, touch sensor 1128 can also determine a location of a touch on the cover glass. A touch sensor may be incorporated into or on the display stack in order to determine a location of a touch. The touch sensor may be self-capacitive in certain embodiments, mutual-capacitive in others, or a combination thereof.

The display stack may include a cover element, such as a cover glass, overlying a display. The cover glass need not necessarily be formed from glass, although that is an option; it may be formed from sapphire, zirconia, alumina, chemically strengthened glass, hardened plastic and so on. Likewise, the display may be a liquid crystal display, an organic light-emitting diode display, or any other suitable display technology. Among other elements, the display stack may include a backlight in some embodiments.

Camera 1129 can include, e.g., a compact digital camera that includes an image sensor such as a CMOS sensor and optical components (e.g. lenses) arranged to focus an image onto the image sensor, along with control logic operable to use the imaging components to capture and store still and/or video images. Images can be stored, e.g., in storage subsystem 1104 and/or transmitted by wearable device 1100 to other devices for storage. Depending on implementation, the optical components can provide fixed focal distance or variable focal distance; in the latter case, autofocus can be provided. In some embodiments, camera 1129 can be disposed along an edge of face portion 1002 of FIG. 10, e.g., the top edge, and oriented to allow a user to capture images of nearby objects in the environment such as a bar code or QR code. In other embodiments, camera 1129 can be disposed on the front surface of face member 1002 of FIG. 10, e.g., to capture images of the user. Zero, one, or more cameras can be provided, depending on implementation.

In some embodiments, user interface 1106 can provide output to and/or receive input from an auxiliary device such as a headset. For example, audio jack 1130 can connect via an audio cable (e.g., a standard 2.5-mm or 3.5-mm audio cable) to an auxiliary device. Audio jack 1130 can include input and/or output paths. Accordingly, audio jack 1130 can provide audio to the auxiliary device and/or receive audio from the auxiliary device. In some embodiments, a wireless connection interface can be used to communicate with an auxiliary device.

Processing subsystem 1102 can be implemented as any electronic device capable of processing, receiving, or transmitting data or instructions. Processing subsystem 1102 can include one or more integrated circuits. For example, processing subsystem 1102 may include one or more of: one or more single-core or multi-core processors or microcontrollers, a central processing unit (CPU), an application-specific integrated circuit (ASIC), a digital signal processor (DSP), or additional combinations of such devices. In operation, processing subsystem 1102 can control the operation of wearable device 1100. In various embodiments, processing subsystem 1102 can execute a variety of programs in response to program code and can maintain multiple concurrently executing programs or processes. At any given time, some or all of the program code to be executed can be resident in processing subsystem 1102 and/or in storage media such as storage subsystem 1104.

Through suitable programming, processing subsystem 1102 can provide various functionality for wearable device 1100. For example, in some embodiments, processing subsystem 1102 can execute an operating system (OS) 1132 and various applications for interfacing with a host device, such as a phone-interface application 1134, a text-interface application 1136, and/or a media interface application 1138. In some embodiments, some or all of these application programs can interact with a host device, e.g., by generating messages to be sent to the host device and/or by receiving and interpreting messages from the host device. In some embodiments, some or all of the application programs can operate locally to wearable device 1100. For example, if wearable device 1100 has a local media library stored in storage subsystem 1104, media interface application 1138 can provide a user interface to select and play locally stored media items. Examples of interface applications are described below.

In some embodiments, processing subsystem 1102 can also execute a host security process 1160 that provides support for establishing and maintaining a verified communication session with a host device. A verified communication session can provide an enhanced level of security, and various operations of wearable device 1100 and/or a host device can be made conditional on whether a verified communication session between the devices is in progress. For instance, host security process 1160 can facilitate unlocking a host device when wearable device 1100 is present, depending on whether a verified session is in progress. User data 1162 can include any information specific to a user, such as identification information, user-specified settings and preferences, customized information (e.g., contacts, predefined text messages), and any other user-related data or content. In some embodiments, executing applications and processes can access user data 1162 to facilitate operations.

RF (radio frequency) interface 1108 can allow wearable device 1100 to communicate wirelessly with various host devices. RF interface 1108 can include RF transceiver components such as an antenna and supporting circuitry to enable data communication over a wireless medium, e.g., using Wi-Fi (IEEE 802.11 family standards), Bluetooth® (a family of standards promulgated by Bluetooth SIG, Inc.), or other protocols for wireless data communication. RF interface 1108 can be implemented using a combination of hardware (e.g., driver circuits, antennas, modulators/demodulators, encoders/decoders, and other analog and/or digital signal processing circuits) and software components. In some embodiments, RF interface 1108 can provide near-field communication ("NFC") capability, e.g., implementing the ISO/IEC 18092 standards or the like; NFC can support wireless data exchange between devices over a very short range (e.g., 20 centimeters or less). Multiple different wireless communication protocols and associated hardware can be incorporated into RF interface 1108. Wearable device 1100 may wirelessly communicate with a sales terminal nearby, thus permitting a user to quickly and efficiently conduct a transaction such as selling, buying, or returning a good. Wearable device 1100 may use NFC technology to perform these and other functions.

Connector interface 1110 can allow wearable device 1100 to communicate with various host devices via a wired communication path, e.g., using Universal Serial Bus (USB), universal asynchronous receiver/transmitter (UART), or other protocols for wired data communication. In some embodiments, connector interface 1110 can provide a power port, allowing wearable device 1100 to receive power, e.g., to charge an internal battery. For example, connector interface 1110 can include a connector such as a mini-USB connector or a custom connector, as well as supporting circuitry. In some embodiments, the connector can be a custom connector that provides dedicated power and ground contacts, as well as digital data contacts that can be used to implement different communication technologies in parallel; for instance, two pins can be assigned as USB data pins (D+ and D−) and two other pins can be assigned as serial transmit/receive pins (e.g., implementing a UART interface). The assignment of pins to particular communication technologies can be hardwired or negotiated while the connection is being established. In some embodiments, the connector can also provide connections for audio and/or video signals, which may be transmitted to or from a host device in analog and/or digital formats.

In some embodiments, connector interface 1110 and/or RF interface 1108 can be used to support synchronization operations in which data is transferred from a host device to wearable device 1100 (or vice versa). For example, as described below, a user can customize certain information for wearable device 1100 (e.g., a "favorite" contacts list and/or specific predefined text messages that can be sent). While user interface 1106 can support data-entry operations, a user may find it more convenient to define customized information on a separate device (e.g., a tablet or smartphone) that has a larger interface (e.g., including a real or virtual alphanumeric keyboard), then transfer the customized information to wearable device 1100 via a synchronization operation. Synchronization operations can also be used to load and/or update other types of data in storage subsystem 1104, such as media items, application programs, and/or operating system programs. Synchronization operations can be performed in response to an explicit user request and/or automatically, e.g., when wireless device 1100 resumes communication with a particular host device or in response to either device receiving an update to its copy of synchronized information.

Environmental sensors 1114 can include various electronic, mechanical, electromechanical, optical, or other devices that provide information related to external conditions around wearable device 1100. Sensors 1114 in some embodiments can provide digital signals to processing subsystem 1102, e.g., on a streaming basis or in response to polling by processing subsystem 1102 as desired. Any type and combination of environmental sensors can be used; shown by way of example are accelerometer 1142, a magnetometer 1144, a gyroscope sensor 1146, and a GPS receiver 1148.

Some environmental sensors can provide information about the location and/or motion of wearable device 1100. For example, accelerometer 1142 can sense acceleration (relative to free fall) along one or more axes, e.g., using piezoelectric or other components in conjunction with associated electronics to produce a signal. Magnetometer 1144 can sense an ambient magnetic field (e.g., Earth's magnetic field) and generate a corresponding electrical signal, which can be interpreted as a compass direction. Gyroscopic sensor 1146 can sense rotational motion in one or more directions, e.g., using one or more MEMS (micro-electro-mechanical systems) gyroscopes and related control and sensing circuitry. Global Positioning System (GPS) receiver 1148 can determine location based on signals received from GPS satellites.

Other sensors can also be included in addition to or instead of these examples. For example, a sound sensor can incorporate microphone 1126 together with associated circuitry and/or program code to determine, e.g., a decibel level of ambient sound. Temperature sensors, proximity sensors, ambient light sensors, or the like can also be included. The ambient light sensor may permit the device to sense a brightness of its environment and adjust certain operational parameters accordingly. For example, wearable device 1100 may modify a brightness of a display in response to the sensed ambient light. As another example, wearable device 1100 may turn the display off if little or no light is sensed for a period of time.

Sensors 1116 can include various electronic, mechanical, electromechanical, optical, or other devices that provide information to wearable device 1100. For instance, clasp sensor 1150 can be at least partially disposed within either or both of clasp members 1010A, 1010B of FIG. 10 and can detect when clasp members 1010A, 1010B are engaged with each other or disengaged from each other. For example, engaging clasp members 1010A, 1010B to each other can complete an electrical circuit, allowing current to flow through clasp sensor 1150; disengaging clasp members 1010A, 1010B from each other can break the circuit. As another example, one or more crown sensors 1152 can be disposed to detect input from crown 1012 of FIG. 10. Crown sensors 1152 can also include motion sensors, accelerometers, pressure sensors (e.g., piezoelectric devices), or the like.

Any other type of sensor can be used in addition to or instead of strap sensors 1116 and crown sensors 1152. For instance, physiological or biometric sensors, such as pulse sensors, ECG sensors, or the like can be provided. In some embodiments, physiological sensors can monitor a user's physiological signals and provide health-related information based on those signals. In certain embodiments, physiological or biometric sensors can be used in verifying the identity of the wearer of wearable device 1100.

Certain embodiments may incorporate one or more biometric sensors to measure certain physiological characteristics of a user. The device may include a photoplesymogram sensor to determine a user's heart rate or blood oxygenation levels, for example. The device may also or instead include electrodes to measure the body impedance of a user, which may permit the device to estimate body fat percentages, the body's electrical activity, body impedance, and so on. In some embodiments, the device may also measure blood pressure, ultraviolet exposure, etc. Depending on the sensors incorporated into or associated with the electronic device, a variety of user characteristics may be measured and/or estimated, thereby permitting different health information to be provided to a user. In some examples, the sensed biometric information may be used by the alert manager, in part, for managing the electronic content and/or the incoming alerts.

Similarly, wearable device 1100 may include a force sensor (not shown here) to determine an amount of force applied to the cover glass. The force sensor may be a capacitive sensor in some embodiments and a strain sensor in other embodiments. In either embodiment, the force sensor is generally transparent and made form transparent materials, or is located beneath or away from the display in order not to interfere with the view of the display. The force sensor may, for example, take the form of two capacitive plates separated by silicone or another deformable material. As the capacitive plates move closer together under an external force, the change in capacitance may be measured and a value of the external force correlated from the capacitance change. Further, by comparing relative capacitance changes from multiple points on the force sensor, or from multiple force sensors, a location or locations at which force is exerted may be determined. In one embodiment the force sensor may take the form of a gasket extending beneath the periphery of the display. The gasket may be segmented or unitary, depending on the embodiment.

Power subsystem 1112 can provide power and power management capabilities for wearable device 1100. For example, power subsystem 1112 can include a battery 1140 (e.g., a rechargeable battery) and associated circuitry to distribute power from battery 1140 to other components of wearable device 1100 that require electrical power. In some embodiments, power subsystem 1112 can also include circuitry operable to charge battery 1140, e.g., when connector interface 1110 is connected to a power source. In some embodiments, power subsystem 1112 can include a "wireless" charger, such as an inductive charger, to charge battery 1140 without relying on connector interface 1110. An inductive charging base may transmit power to an inductive receiver within the device in order to charge a battery of the device. Further, by varying the inductive field between the device and base, data may be communicated between the two. As one simple non-limiting example, this may be used to wake the base from a low-power sleep state to an active charging state when the device is placed on the base. Other wireless charging systems also may be used (e.g., near field magnetic resonance and radio frequency). Alternatively, the device also may employ wired charging through electrodes. In some embodiments, power subsystem 1112 can also include other power sources, such as a solar cell, in addition to or instead of battery 1140.

In some embodiments, power subsystem 1112 can control power distribution to components within wearable device 1100 to manage power consumption efficiently. For example, power subsystem 1112 can automatically place device 1100 into a "hibernation" state when strap sensors 1116 indicate that device 1100 is not being worn. The hibernation state can be designed to reduce power consumption; accordingly, user interface 1106 (or components thereof), RF interface 1108, connector interface 1110, and/or environmental sensors 1114 can be powered down (e.g., to a low-power state or turned off entirely), while strap sensors 1116 are powered up (either continuously or at intervals) to detect when a user puts on wearable device 1100. As another example, in some embodiments, while wearable device 1100 is being worn, power subsystem 1112 can turn display 1120 and/or other components on or off depending on motion and/or orientation of wearable device 1100 detected by environmental sensors 1114. For instance, if wearable device 1100 is designed to be worn on a user's wrist, power subsystem 1112 can detect raising and rolling of a user's wrist, as is typically associated with looking at a wristwatch, based on information provided by accelerometer 1142. In response to this detected motion, power subsystem 1112 can automatically turn display 1120 and/or touch sensor 1128 on; similarly, power subsystem 1112 can automatically turn display 1120 and/or touch sensor 1128 off in response to detecting that user's wrist has returned to a neutral position (e.g., hanging down).

Power subsystem 1112 can also provide other power management capabilities, such as regulating power consumption of other components of wearable device 1100 based on the source and amount of available power, monitoring stored power in battery 1140, generating user alerts if the stored power drops below a minimum level, and so on.

In some embodiments, control functions of power subsystem 1112 can be implemented using programmable or controllable circuits operating in response to control signals generated by processing subsystem 1102 in response to program code executing thereon, or as a separate processor or microcontroller.

It will be appreciated that wearable device 1100 is illustrative and that variations and modifications are possible.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for displaying text on a watch face of an electronic watch, the method comprising, at the electronic watch:
   receiving, from a user, a selection of a first client application for providing first information to be displayed as a complication in a first style window on the watch face of the electronic watch, wherein the first style window is one of a plurality of different style windows having different sizes;
   sending, by a display manager, information identifying a size and a type of the first style window to the first client application to inform a complication controller of the first client application that the first client application is assigned to the first style window, wherein in response to said informing the complication controller selects a first template of a plurality of templates stored on the electronic watch, the first template corresponding to the first style window used to display data in the complication and generates a first data item in accordance with the first template by selecting a first identifier corresponding to the first template;
   receiving, by the display manager from the complication controller of the first client application, a first data object including the first data item for displaying in the first style window, wherein the first data item includes: first data, and
      the first identifier corresponding to a first display function of a plurality of display functions to be used in displaying the first data, the plurality of display functions corresponding to the plurality of templates, wherein the first display function specifies a set of rules for the display manager to fit the first data within the first style window according to the first template;
   invoking, by the display manager, the first display function to determine a first potential text string to display based on the first data;
   determining a first length of the first potential text string;
   comparing the first length to a first maximum length for displaying the first data to determine that the first length is greater than the first maximum length;
   determining, with the first display function, a second potential text string having a second length that is shorter than the first length according to a first set of one or more rules; and
   displaying the second potential text string in the first style window when the second length is shorter than or equal to the first maximum length.

2. The method of claim 1, wherein a second client application is selected for providing second information to be displayed in a second style window, the method further comprising, at the electronic watch: receiving, by the display manager from the second client application, a second data object including a second data item for displaying in the second style window, wherein the second data object is defined using a second template of a second plurality of templates for the second style window, and wherein the second data item includes: second data, and a second identifier corresponding to a second display function to be used in displaying the second data; and invoking, by the display manager, the second display function for displaying, in the second style window, the second data with less than a second maximum length.

3. The method of claim 1, wherein after displaying the second potential text string in the first style window, a second client application is selected for providing data to be displayed in the first style window, the method further comprising, at the electronic watch: receiving, by the display manager from the second client application, a second data object including a second data item for displaying in the first style window, wherein the second data object is defined using the first template, and wherein the second data item includes: second data, and a second identifier corresponding to a second display function to be used in displaying the second data; and invoking, by the display manager, the second display function for displaying, in the first style window, the second data with less than a second maximum length.

4. The method of claim 1, wherein the first data object includes a second data item, wherein the second data item includes:
   second data, and
   a second identifier corresponding to a second display function to be used in displaying the second data,
   the method further comprising, at the electronic watch:
   invoking, by the display manager, the second display function for displaying, in the first style window, the second data with less than a second maximum length.

5. The method of claim 4, wherein the second maximum length is different than the first maximum length.

6. The method of claim 1, wherein a plurality of complications are displayed simultaneously on the watch face of the electronic watch as a time display.

7. The method of claim 1, wherein the first data object includes a design property, wherein the first display function uses the design property to determine a format for displaying the first data.

8. The method of claim 7, wherein the first set of one or more rules is dependent on the design property.

9. The method of claim 1, wherein first data is text data.

10. The method of claim 1, wherein the first data includes a first date or a first time, and wherein the first display function determines a difference between a current date or a current time and the first date or the first time, respectively.

11. The method of claim 1, wherein the first data item is a first data sub-item of a first parent data item, and wherein the first data sub-item is included in a plurality of data sub-items for displaying the first parent data item, wherein each of the plurality of data sub-items includes a respective identifier for a respective display function.

12. The method of claim 1, wherein the first data object further comprises one or more first units specifying one or more portions of the first data to be displayed in the first style window.

13. The method of claim 12, wherein the first identifier includes an API function call with the first data and the one or more first units as arguments.

14. A computer product comprising a non-transitory storage medium storing instructions that when executed control an electronic watch to display text on a watch face of the electronic watch, the instructions comprising:

receiving, from a user, a selection of a first client application for providing first information to be displayed as a complication in a first style window on the watch face of the electronic watch, wherein the first style window is one of a plurality of different style windows having different sizes;

sending, by a display manager, information identifying a size and a type of the first style window to the first client application to inform a complication controller of the first client application that the first client application is assigned to the first style window, wherein in response to said informing the complication controller selects a first template of a plurality of templates stored on the electronic watch, the first template corresponding to the first style window used to display data in the complication and generates a first data item in accordance with the first template by selecting a first identifier corresponding to the first template;

receiving, by the display manager from the complication controller of the first client application, a first data object including the first data item for displaying in the first style window, wherein the first data item includes:
first data, and
the first identifier corresponding to a first display function of a plurality of display functions to be used in displaying the first data, the plurality of display functions corresponding to the plurality of templates, wherein the first display function specifies a set of rules for the display manager to fit the first data within the first style window according to the first template;

invoking, by the display manager, the first display function to determine a first potential text string to display based on the first data;

determining a first length of the first potential text string;

comparing the first length to a first maximum length for displaying the first data to determine that the first length is greater than the first maximum length;

determining, with the first display function, a second potential text string having a second length that is shorter than the first length according to a first set of one or more rules; and displaying the second potential text string in the first style window when the second length is shorter than or equal to the first maximum length.

15. The computer product of claim 14, wherein the first data object is defined using a first template of a first plurality of templates for the first style window, wherein a second client application is selected for providing second information to be displayed in a second style window, wherein the instructions further comprise:

receiving, by the display manager from the second client application, a second data object including a second data item for displaying in the second style window, wherein the second data object is defined using a second template of a second plurality of templates for the second style window, and wherein the second data item includes:
second data, and
a second identifier corresponding to a second display function to be used in displaying the second data; and invoking, by the display manager, the second display function for displaying, in the second style window, the second data with less than a second maximum length.

16. The computer product of claim 14, wherein the first data object includes a second data item, wherein the second data item includes:
second data, and
a second identifier corresponding to a second display function to be used in displaying the second data,
wherein the instructions further comprise:
invoking, by the display manager, the second display function for displaying, in the first style window, the second data with less than a second maximum length.

17. The computer product of claim 14, wherein the first data item is a first data sub-item of a first parent data item, and wherein the first data sub-item is included in a plurality of data sub-items for displaying the first parent data item, wherein each of the plurality of data sub-items includes a respective identifier for a respective display function.

18. An electronic watch comprising:
a watch face; and
one or more processors configured to:
receive, from a user, a selection of a first client application for providing first information to be displayed as a complication in a first style window on the watch face of the electronic watch, wherein the first style window is one of a plurality of different style windows having different sizes;
send, by a display manager, information identifying a size and a type of the first style window to the first client application to inform a complication controller of the first client application that the first client application is assigned to the first style window, wherein in response to said informing the complication controller selects a first template of a plurality of templates stored on the electronic watch, the first template corresponding to the first style window used to display data in the complication and generates a first data item in accordance with the first template by selecting a first identifier corresponding to the first template;
receive, by the display manager from the complication controller of the first client application, a first data object including the first data item for displaying in the first style window, wherein the first data item includes:
first data, and
the first identifier corresponding to a first display function of a plurality of display functions to be used in displaying the first data, the plurality of display functions corresponding to the plurality of templates, wherein the first display function specifies a set of rules for the display manager to fit the first data within the first style window according to the first template;
invoke, by the display manager, the first display function to determine a first potential text string to display based on the first data;
determine a first length of the first potential text string;
compare the first length to a first maximum length for displaying the first data to determine that the first length is greater than the first maximum length;
determine, with the first display function, a second potential text string having a second length that is shorter than the first length according to a first set of one or more rules; and
display the second potential text string in the first style window when the second length is shorter than or equal to the first maximum length.

19. The electronic watch of claim 18, wherein the first data object is defined using a first template of a first plurality of templates for the first style window, wherein a second client application is selected for providing second information to be displayed in a second style window, wherein the one or more processors are further configured to:

receive, by the display manager from the second client application, a second data object including a second data item for displaying in the second style window, wherein the second data object is defined using a second template of a second plurality of templates for the second style window, and wherein the second data item includes:

second data, and a second identifier corresponding to second display function to be used in displaying the second data; and invoke, by the display manager, a second display function for displaying, in the second style window, the second data with less than a second maximum length.

20. The electronic watch of claim 18, wherein the first data object includes a second data item, wherein the second data item includes:

second data, and a second identifier corresponding to a second display function to be used in displaying the second data, wherein the one or more processors further configured to:

invoking, by the display manager, the second display function for displaying, in the first style window, the second data with less than a second maximum length.

\* \* \* \* \*